United States Patent
Dropps et al.

(10) Patent No.: US 7,522,529 B2
(45) Date of Patent: Apr. 21, 2009

(54) METHOD AND SYSTEM FOR DETECTING CONGESTION AND OVER SUBSCRIPTION IN A FIBRE CHANNEL NETWORK

(75) Inventors: Frank R. Dropps, Maple Grove, MN (US); Edward C. Ross, Edina, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 977 days.

(21) Appl. No.: 10/895,175

(22) Filed: Jul. 20, 2004

(65) Prior Publication Data

US 2005/0030893 A1 Feb. 10, 2005

Related U.S. Application Data

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/572,197, filed on May 18, 2004, provisional application No. 60/532,963, filed on Dec. 29, 2003.

(51) Int. Cl.
*H04L 12/26* (2006.01)
(52) U.S. Cl. .................................. 370/237; 370/395.4
(58) Field of Classification Search ................. 370/237, 370/230.1, 235, 235.1, 236, 242–244, 395.4, 370/474
See application file for complete search history.

(56) References Cited

U.S. PATENT DOCUMENTS 4,081,612 A 3/1978 Hafner (Continued)

FOREIGN PATENT DOCUMENTS

EP 0649098 9/1994

(Continued)

OTHER PUBLICATIONS

Banks, David C., et al., "Link Trunking and Measuring Link Latency in Fibre Channel Fabric", U.S. Appl. No. 60/286,046, 1-52.

(Continued)

*Primary Examiner*—Kwang B Yao
*Assistant Examiner*—Andrew Lai
(74) *Attorney, Agent, or Firm*—Klein, O'Neill & Singh, LLP

(57) ABSTRACT

A method and system for detecting congestion and over-subscription in a fiber channel switch element is provided. A counter is updated if a frame cannot be transmitted due to lack of credit; then the counter value is compared to a threshold value; and an event is triggered if the counter value varies from the threshold value. Also, provided is a first register that maintains information regarding a rate at which a source port can transfer data; a counter that counts entries corresponding to a number of frames to be transmitted at a given time; and a second register that determines an over-subscription rate.

10 Claims, 19 Drawing Sheets

U.S. PATENT DOCUMENTS

| | | | |
|---|---|---|---|
| 4,162,375 A | 7/1979 | Schilichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,964,119 A * | 10/1990 | Endo et al. | 370/237 |
| 4,980,857 A | 12/1990 | Walter et al. | |
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,258,751 A | 11/1993 | DeLuca et al. | |
| 5,260,933 A | 11/1993 | Rouse | |
| 5,260,935 A | 11/1993 | Turner | |
| 5,280,483 A * | 1/1994 | Kamoi et al. | 370/234 |
| 5,291,481 A * | 3/1994 | Doshi et al. | 370/230 |
| 5,339,311 A | 8/1994 | Turner | |
| 5,367,520 A | 11/1994 | Cordell | 370/60 |
| 5,390,173 A | 2/1995 | Spinney et al. | |
| 5,425,022 A | 6/1995 | Clark et al. | |
| 5,537,400 A | 7/1996 | Diaz et al. | |
| 5,568,165 A | 10/1996 | Kimura | |
| 5,568,167 A | 10/1996 | Galbi et al. | |
| 5,579,443 A | 11/1996 | Tatematsu et al. | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,666,483 A | 9/1997 | McClary | |
| 5,677,909 A | 10/1997 | Heide | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,732,206 A | 3/1998 | Mendel | |
| 5,748,612 A | 5/1998 | Stoevhase et al. | 370/230 |
| 5,757,771 A * | 5/1998 | Li et al. | 370/235 |
| 5,764,927 A | 6/1998 | Murphy et al. | |
| 5,768,271 A | 6/1998 | Seid et al. | |
| 5,768,533 A | 6/1998 | Ran | |
| 5,784,358 A * | 7/1998 | Smith et al. | 370/230 |
| 5,790,545 A | 8/1998 | Holt et al. | |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,835,752 A | 11/1998 | Chiang et al. | |
| 5,850,386 A | 12/1998 | Anderson et al. | |
| 5,892,604 A | 4/1999 | Yamanaka et al. | |
| 5,894,560 A | 4/1999 | Carmichael et al. | |
| 5,925,119 A | 7/1999 | Maroney | |
| 5,936,442 A | 8/1999 | Liu et al. | |
| 5,954,796 A | 9/1999 | McCarty et al. | |
| 5,974,547 A | 10/1999 | Klimenko | |
| 5,978,359 A | 11/1999 | Caldara et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,009,226 A | 12/1999 | Tsuji et al. | |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,046,979 A | 4/2000 | Bauman | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,118,791 A * | 9/2000 | Fichou et al. | 370/468 |
| 6,128,292 A | 10/2000 | Kim et al. | 370/356 |
| 6,134,127 A | 10/2000 | Kirchberg | |
| 6,144,668 A | 11/2000 | Bass et al. | |
| 6,147,976 A | 11/2000 | Shand et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 * | 2/2001 | Berman | 370/351 |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,278,708 B1 | 8/2001 | Von Hammerstein et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 | 10/2001 | Yokoyama et al. | |
| 6,308,220 B1 | 10/2001 | Mathur | 709/238 |
| 6,311,204 B1 | 10/2001 | Mills et al. | |
| 6,324,181 B1 | 11/2001 | Wong et al. | 370/403 |
| 6,330,236 B1 | 12/2001 | Ofek et al. | |
| 6,333,932 B1 * | 12/2001 | Kobayasi et al. | 370/389 |
| 6,335,935 B2 * | 1/2002 | Kadambi et al. | 370/396 |
| 6,343,324 B1 | 1/2002 | Hubis et al. | |
| 6,353,612 B1 | 3/2002 | Zhu et al. | |
| 6,370,605 B1 | 4/2002 | Chong | |
| 6,397,360 B1 | 5/2002 | Bruns | |
| 6,401,128 B1 | 6/2002 | Stai et al. | |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,457,090 B1 | 9/2002 | Young | |
| 6,467,008 B1 | 10/2002 | Gentry, Jr. et al. | 710/261 |
| 6,470,026 B1 | 10/2002 | Pearson et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,563,796 B1 * | 5/2003 | Saito | 370/252 |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,606,690 B2 | 8/2003 | Padovano | |
| 6,614,796 B1 | 9/2003 | Black et al. | |
| 6,622,206 B1 * | 9/2003 | Kanamaru et al. | 711/113 |
| 6,629,161 B2 | 9/2003 | Matsuki et al. | |
| 6,643,298 B1 | 11/2003 | Brunheroto et al. | |
| 6,657,962 B1 | 12/2003 | Barri et al. | |

| | | |
|---|---|---|
| 6,684,209 B1 | 1/2004 | Ito et al. |
| 6,697,359 B1 | 2/2004 | George ................... 370/357 |
| 6,697,368 B2 | 2/2004 | Chang et al. |
| 6,697,914 B1 | 2/2004 | Hospodor et al. |
| 6,718,497 B1 | 4/2004 | Whitby-Strevens |
| 6,738,381 B1 | 5/2004 | Agnevik et al. |
| 6,744,772 B1 | 6/2004 | Eneboe et al. |
| 6,760,302 B1 | 7/2004 | Ellinas et al. |
| 6,779,083 B2 | 8/2004 | Ito et al. |
| 6,807,181 B1 | 10/2004 | Weschler |
| 6,816,492 B1 | 11/2004 | Turner et al. |
| 6,816,750 B1 | 11/2004 | Klaas |
| 6,859,435 B1 | 2/2005 | Lee et al. |
| 6,865,157 B1 | 3/2005 | Scott et al. |
| 6,886,141 B1 | 4/2005 | Kunz et al. |
| 6,888,831 B1 | 5/2005 | Hospodor et al. |
| 6,901,072 B1 | 5/2005 | Wong |
| 6,904,507 B2 | 6/2005 | Gil |
| 6,922,408 B2 | 7/2005 | Bloch et al. |
| 6,928,470 B1 | 8/2005 | Hamlin |
| 6,934,799 B2 | 8/2005 | Acharya et al. |
| 6,941,357 B2 | 9/2005 | Nguyen et al. |
| 6,941,482 B2 | 9/2005 | Strong |
| 6,947,393 B2 | 9/2005 | Hooper, III |
| 6,952,659 B2 | 10/2005 | King et al. |
| 6,968,463 B2 | 11/2005 | Pherson et al. |
| 6,975,627 B1 | 12/2005 | Parry et al. |
| 6,987,768 B1 | 1/2006 | Kojima et al. |
| 6,988,130 B2 | 1/2006 | Blumenau et al. |
| 6,988,149 B2 | 1/2006 | Odenwald |
| 7,000,025 B1 | 2/2006 | Wilson |
| 7,002,926 B1 | 2/2006 | Eneboe et al. |
| 7,010,607 B1 | 3/2006 | Bunton |
| 7,024,410 B2 | 4/2006 | Ito et al. |
| 7,031,615 B2 | 4/2006 | Genrile |
| 7,039,070 B2 | 5/2006 | Kawakatsu |
| 7,039,870 B2 | 5/2006 | Takaoka et al. |
| 7,047,326 B1 | 5/2006 | Crosbie et al. |
| 7,050,392 B2 | 5/2006 | Valdevit |
| 7,051,182 B2 | 5/2006 | Blumenau et al. |
| 7,055,068 B2 | 5/2006 | Riedl |
| 7,061,862 B2 | 6/2006 | Horiguchi et al. |
| 7,061,871 B2 | 6/2006 | Sheldon et al. |
| 7,076,569 B1 | 7/2006 | Bailey et al. |
| 7,092,374 B1 | 8/2006 | Gubbi |
| 7,110,394 B1 | 9/2006 | Chamdani et al. |
| 7,120,728 B2 | 10/2006 | Krakirian et al. |
| 7,123,306 B1 | 10/2006 | Goto et al. |
| 7,124,169 B2 | 10/2006 | Shimozono et al. |
| 7,150,021 B1 | 12/2006 | Vajjhala et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,221,650 B1 | 2/2007 | Cooper et al. |
| 7,187,688 B2 | 3/2007 | Garmire et al. |
| 7,188,364 B2 | 3/2007 | Volpano |
| 7,190,667 B2 | 3/2007 | Susnow et al. |
| 7,194,538 B1 | 3/2007 | Rabe et al. |
| 7,200,108 B2 | 4/2007 | Beer et al. |
| 7,200,610 B1 | 4/2007 | Prawdiuk et al. |
| 7,209,478 B2 | 4/2007 | Rojas et al. |
| 7,215,680 B2 | 5/2007 | Mullendore et al. |
| 7,230,929 B2 | 6/2007 | Betker et al. |
| 7,233,985 B2 | 6/2007 | Hahn et al. |
| 7,245,613 B1 | 7/2007 | Winkles et al. |
| 7,248,580 B2 | 7/2007 | George et al. |
| 6,785,241 B1 | 8/2007 | Lu et al. |
| 7,263,593 B2 | 8/2007 | Honda et al. |
| 7,266,286 B2 | 9/2007 | Tanizawa et al. |
| 7,269,168 B2 | 9/2007 | Roy et al. |
| 7,277,431 B2 | 10/2007 | Walter et al. |
| 7,287,063 B2 | 10/2007 | Baldwin et al. |
| 7,269,131 B2 | 11/2007 | Cashman et al. |
| 7,292,593 B1 | 11/2007 | Winkles et al. |
| 7,315,511 B2 | 1/2008 | Morita et al. |
| 7,327,680 B1 | 2/2008 | Kloth |
| 7,346,707 B1 | 3/2008 | Erimli |
| 7,352,740 B2 | 4/2008 | Hammons et al. |
| 7,397,788 B2 | 7/2008 | Mies et al. |
| 7,406,034 B1 | 7/2008 | Cometto et al. |
| 2001/0011357 A1 | 8/2001 | Mori |
| 2001/0022823 A1 | 9/2001 | Renaud |
| 2001/0033552 A1 | 10/2001 | Barrack et al. |
| 2001/0038628 A1 | 11/2001 | Ofek et al. |
| 2001/0043564 A1 | 11/2001 | Bloch et al. |
| 2001/0047460 A1 | 11/2001 | Kobayashi et al. |
| 2002/0016838 A1 | 2/2002 | Geluc et al. |
| 2002/0034178 A1 | 3/2002 | Schmidt et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0118692 A1 | 8/2002 | Oberman et al. |
| 2002/0122428 A1* | 9/2002 | Fan et al. ................. 370/395.4 |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 | 11/2002 | Schimke et al. |
| 2002/0191602 A1 | 12/2002 | Woodring et al. |
| 2002/0194294 A1 | 12/2002 | Blumenau et al. |
| 2002/0196773 A1 | 12/2002 | Berman |
| 2003/0002503 A1 | 1/2003 | Brewer et al. |
| 2003/0002516 A1 | 1/2003 | Boock et al. |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0033487 A1 | 2/2003 | Pfister et al. |
| 2003/0035433 A1 | 2/2003 | Craddock et al. |
| 2003/0046396 A1 | 3/2003 | Richter et al. |
| 2003/0056000 A1 | 3/2003 | Mullendore et al. |
| 2003/0063567 A1 | 4/2003 | Dehart |
| 2003/0072316 A1 | 4/2003 | Niu et al. |
| 2003/0076788 A1 | 4/2003 | Grabauskas et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0093607 A1 | 5/2003 | Main et al. |
| 2003/0103451 A1 | 6/2003 | Lutgen et al. |
| 2003/0112819 A1 | 6/2003 | Kofoed et al. |
| 2003/0115355 A1 | 6/2003 | Cometto et al. |
| 2003/0117961 A1 | 6/2003 | Chuah et al. |
| 2003/0118053 A1 | 6/2003 | Edsall et al. |
| 2003/0120743 A1 | 6/2003 | Coatney et al. |
| 2003/0120791 A1 | 6/2003 | Weber et al. |
| 2003/0120983 A1 | 7/2003 | Vieregge et al. |
| 2003/0126223 A1 | 7/2003 | Jenne et al. |
| 2003/0126242 A1 | 7/2003 | Chang |
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ............... 370/389 |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |

| | | | |
|---|---|---|---|
| 2003/0198238 | A1 | 10/2003 | Westby |
| 2003/0218986 | A1 | 11/2003 | DeSanti et al. |
| 2003/0229808 | A1 | 12/2003 | Heintz et al. |
| 2003/0236953 | A1 | 12/2003 | Grieff et al. |
| 2004/0013088 | A1 | 1/2004 | Gregg |
| 2004/0013092 | A1 | 1/2004 | Betker et al. |
| 2004/0013113 | A1 | 1/2004 | Singh et al. |
| 2004/0013125 | A1 | 1/2004 | Betker et al. |
| 2004/0015638 | A1 | 1/2004 | Bryn |
| 2004/0024831 | A1 | 2/2004 | Yang et al. |
| 2004/0028038 | A1 | 2/2004 | Anderson et al. |
| 2004/0054776 | A1* | 3/2004 | Klotz et al. ................. 709/224 |
| 2004/0054866 | A1 | 3/2004 | Blumenau et al. |
| 2004/0057389 | A1 | 3/2004 | Klotz et al. |
| 2004/0064664 | A1 | 4/2004 | Gil |
| 2004/0081186 | A1 | 4/2004 | Warren et al. |
| 2004/0081196 | A1 | 4/2004 | Elliott |
| 2004/0081394 | A1 | 4/2004 | Biren et al. |
| 2004/0085955 | A1 | 5/2004 | Walter et al. |
| 2004/0085974 | A1 | 5/2004 | Mies et al. |
| 2004/0085994 | A1 | 5/2004 | Warren et al. |
| 2004/0092278 | A1 | 5/2004 | Diepstraten et al. |
| 2004/0100944 | A1 | 5/2004 | Richmond et al. |
| 2004/0109418 | A1 | 6/2004 | Fedorkow et al. |
| 2004/0123181 | A1 | 6/2004 | Moon et al. |
| 2004/0141518 | A1 | 7/2004 | Milligan et al. |
| 2004/0141521 | A1 | 7/2004 | George ....................... 370/463 |
| 2004/0151188 | A1 | 8/2004 | Maveli et al. |
| 2004/0153526 | A1 | 8/2004 | Haun et al. |
| 2004/0153914 | A1 | 8/2004 | El-Batal |
| 2004/0174813 | A1 | 9/2004 | Kasper et al. |
| 2004/0202189 | A1 | 10/2004 | Arndt et al. |
| 2004/0208201 | A1 | 10/2004 | Otake |
| 2004/0267982 | A1 | 12/2004 | Jackson et al. |
| 2005/0023656 | A1 | 2/2005 | Leedy |
| 2005/0036499 | A1 | 2/2005 | Dutt et al. |
| 2005/0036763 | A1 | 2/2005 | Kato et al. |
| 2005/0047334 | A1 | 3/2005 | Paul et al. |
| 2005/0073956 | A1 | 4/2005 | Moores et al. |
| 2005/0076113 | A1 | 4/2005 | Klotz et al. |
| 2005/0088969 | A1 | 4/2005 | Carlsen et al. |
| 2005/0108444 | A1* | 5/2005 | Flauaus et al. ................. 710/15 |
| 2005/0111845 | A1 | 5/2005 | Nelson et al. |
| 2005/0117522 | A1 | 6/2005 | Basavaiah et al. |
| 2005/0177641 | A1 | 8/2005 | Yamagami |
| 2005/0198523 | A1 | 9/2005 | Shanbhag et al. |
| 2006/0013248 | A1 | 1/2006 | Mujeeb et al. |
| 2006/0034192 | A1 | 2/2006 | Hurley et al. |
| 2006/0034302 | A1 | 2/2006 | Peterson |
| 2006/0047852 | A1 | 3/2006 | Shah et al. |
| 2006/0074927 | A1 | 4/2006 | Sullivan et al. |
| 2006/0107260 | A1 | 5/2006 | Motta |
| 2006/0143300 | A1 | 6/2006 | See et al. |
| 2006/0184711 | A1 | 8/2006 | Pettey |
| 2006/0203725 | A1 | 9/2006 | Paul et al. |
| 2006/0274744 | A1 | 12/2006 | Nagai et al. |
| 2007/0206502 | A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

"Office Action from USPTO dated Dec. 7, 2007 for U.S. Appl. No. 10/961,463".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Notice of Allowance from USPTO dated Jan. 8, 2008 for U.S. Appl. No. 10/889,551".
"Office Action from USPTO dated Jan. 9, 2008 for U.S. Appl. No. 10/798,468".
"Office Action from USPTO dated Jan. 9, 2008 for U.S. Appl. No. 11/608,634".
"Notice of Allowance from USPTO dated Jan. 11, 2008 for U.S. Appl. No. 10/664,548".
"Notice of Allowance from USPTO dated Jan. 10, 2008 for U.S. Appl. No. 10/263,858".
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Office Action from USPTO dated Mar. 5, 2008 for U.S. Appl. No. 10/889,259".
"Office Action from USPTO dated Mar. 7, 2008 for U.S. Appl. No. 10/894,629".
"Office Action from USPTO dated Mar. 20, 2008 for U.S. Appl. No. 10/894,732".
Curtis, A. R., "Design Considerations for 10-Gbit Fibre Channel", *Curtis A. Ridgeway, Distinguished I/O Architect, Storage and Computing ASIC's Division, LSI Logic Corp.*
Malavalli, Kumar, "High Speed Fibre Channel Switching Fabric Services", *Proceedings of the SPIE, SPIE*, Bellingham, VA, USA vol. 1577,, XP000562869, ISSN: 0277-786X,(Sep. 4, 1991),216-226.
Ridgeway, Curt, "0GFC-40GFC using 4-lane XAUI's", *LSI Logic Presentation*—T11/03-069v0.
"Deliver Server-Free Backup", *Pathlight & Computer Associates*, White Paper of Apr. 2000, Ithaca, New York, XP-002381153, 1-8.
Naik, D., "Inside Windows Storage:Server Storage Technologies for Windows 2000, Windows Server 2003 and Beyond", *Addison-Wesley, US, Chapter 5*, XP-002381152, (Jul. 15, 2003), 137-173.
International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
Brown, Douglas W., "A State-Machine Synthesizer", *18th Design Automation Conference*, (1981),301-305.
"Examination Report from the European Patent Office dated Oct. 12, 2007 for European Application No. 05 805 632.6".
Mallavalli, et al., "Fibre Channel Framing and Signaling (FC-FS) REV 1.10", *NCITS working draft proposed American National Standard for Information Technology*, (Jan. 25, 2001).
Clark, Tom, "Zoning for Fibre Channel Fabrics", Vixel Corporation Paper—XP002185194., (Aug. 1999), pp. 1-6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE, (Sep. 8, 1992), pp. 65-71.
Yoshida, Hu, "LUN Security Considerations for Storage Area Networks," Hitachi Data Systems Paper—XP 002185193 (1999), pp. 1-7.
Claudio DeSanti, "Virtual Fabrics Switch Support" ; VF Switch Support, T11/04-395v2. Sep. 2004, pp. 1-15.
Pelissier et al, "Inter-Fabric Routing", dated Jul. 30, 2004, Inter Fabric Routing (04-520v0); pp. 1-31.
DeSanti et al, "Virtual Fabrics"; Virtual Fabrics, T11/03-352v0, May 2003; pp. 1-4.
Martin et al , "Virtual Channel Architecture", Presentation by Brocade to T11/03-369v0 dated Jun. 2, 2003.
"Office Action from USPTO dated Jan. 19, 2006 for U.S. Appl. No. 10/212,425".
"Office Action from USPTO dated Dec. 5, 2006 for U.S. Appl. No. 10/212,425".

"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Notice of Allowance from USPTO dated Apr. 4, 2008 for U.S. Appl. No. 11/608,634".
"Office Action from USPTO dated Apr. 4, 2008 for U.S. Appl. No. 10/957,465".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 29, 2008 for U.S. Appl. No. 10/894,491".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Jun. 10, 2008 for U.S. Appl. No. 10/894,586".
"Final Office Action from USPTO dated Apr. 1, 2008 for U.S. Appl. No. 10/956,717".
"Office Action from USPTO dated Apr. 3, 2008 for U.S. Appl. No. 10/894,587".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Jun. 27, 2008 for U.S. Appl. No. 10/894,726".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".
"Office Action from USPTO dated Sep. 18, 2008 for U.S. Appl. No. 10/894,978".
"Office Action from USPTO dated Sep. 23, 2008 for U.S. Appl. No. 12/031,585".
"Notice of Allowance from USPTO dated Sep. 29, 2008 for U.S. Appl. No. 10/889,267".
"Final Office Action from USPTO dated Oct. 18, 2008 for U.S. Appl. No. 11/057,912".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".

"Final Office Action from USPTO dated Oct. 17, 2008 for U.S. Appl. No. 10/894,595".

"Final Office Action from USPTO dated Nov. 13, 2008 for U.S. Appl. No. 10/894,587".

"Office Action from USPTO dated Nov. 13, 2008 for U.S. Appl. No. 10/894,917".

"Office Action from USPTO dated Nov. 26, 2008 for U.S. Appl. No. 10/956,502".

"Office Action from USPTO dated Nov. 26, 2008 for U.S. Appl. No. 10/894,547".

"Final Office Action from USPTO dated Dec. 24, 2008 for U.S. Appl. No. 10/894,726".

"Office Action from USPTO dated Dec. 23, 2008 for U.S. Appl. No. 10/798,468".

"Notice of Allowance from USPTO dated Dec. 30, 2008 for U.S. Appl. No. 11/037,922".

* cited by examiner

METHOD AND SYSTEM FOR DETECTING CONGESTION AND OVER SUBSCRIPTION IN A FIBRE CHANNEL NETWORK

CROSS REFERENCE TO RELATED APPLICATIONS

This application claims priority under 35 U.S.C.§ 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled "Method and System for Reducing Latency and Congestion in Fibre Channel Switches";

Filed on Aug. 14, 2003, Ser. No. 60/495,212, entitled "Method and System for Detecting Congestion and Over Subscription in a Fibre channel Network"

Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches"

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane"

Filed on Dec. 29, 2003, Ser. No. 60/532,966, entitled "Method And System For Using Extended Fabric Features With Fibre Channel Switch Elements"

Filed on Mar. 4, 2004, Ser. No. 60/550,250, entitled "Method And System for Programmable Data Dependent Network Routing"

Filed on May 7, 2004, Ser. No. 60/569,436, entitled "Method And System For Congestion Control In A Fibre Channel Switch"

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to detecting congestion and oversubscription in fibre channel switches.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O (input/output) subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames a Fibre Channel port can transmit without overflowing the receive buffers at the other end of the link. Receiving an R_RDY primitive signal increases the credit, and sending a frame decreases the credit. The initial amount of credit is negotiated by two ends of the link during login. Credit counts can be implemented on a transmit port by starting at zero and counting up to the maximum, or by starting at the maximum and counting down to zero.

When using large networks, bottlenecks may occur that could reduce the performance of a network. Fibre Channel networks use flow control to make sure that for every transmitted frame there is a receive buffer at the other end of the link.

Congestion on a Fibre Channel network will prevent ports from transmitting frames while waiting for flow control signals (the R_RDY primitive signal in Fibre Channel).

In a Fabric with multiple switches, congestion may occur if more traffic is being routed through an E-port than it can handle. The use of frame counts or byte counts is not sufficient to detect congestion.

Often a fibre channel switch is coupled between devices that use varying data rates to transfer data. The mismatch in the data transfer rates can result in inefficient use of the overall bandwidth. An illustration of this problem is shown in FIG. 2. FIG. 2 shows switches 207 and 209 coupled by a 10 G (gigabytes) link 208. Host systems 203 and 202 are coupled to switch 207 by 2 G links 204 and 205, respectively. Host system 201 is coupled by a 1 G link 206. A target 213 is coupled to switch 209 by a 1 G link 210, while targets 214 and 215 are coupled by 2 G links 211 and 212, respectively. Host system may be any computing device and a target may be any device with which a host or another target can communicate.

Host 203 can send data at 2 G to target 213 that can receive data at 1 G. Since target 213 receives data at a lower rate that can overfill the receive buffers in switch 209 resulting in congestion.

As data rates increase (for example, from 1 G to 10 G), Fibre Channel networks will need efficient congestion and over subscription detection techniques. Therefore, what is required is a process and system that efficiently detects congestion and over subscription.

SUMMARY OF THE INVENTION

In one aspect of the present invention, a method for detecting congestion in a transmit side of a fibre channel switch element is provided. The method includes, updating a counter if a frame cannot be transmitted from a transmit side of a switch due to lack of credit; comparing the counter value to a threshold value; and triggering a threshold event if the counter value varies from the threshold value.

In another aspect, a method for detecting congestion on a receive segment of a fibre channel switch element is provided. The method includes, comparing a counter value to a threshold value, if a receive buffer is full; and triggering a threshold event if the counter value varies from the threshold value.

In yet another aspect of the present invention, a method for detecting congestion in a transmit segment of a fibre channel switch element is provided. The method includes, determining if credit is available for transmitting a frame; triggering an event based on a duration that the frame waits for transmission; and notifying a processor based on such event. A first counter value is compared to a threshold value to trigger the event.

In yet another aspect of the present invention, a method for detecting congestion at a receive segment of a fibre channel switch element is provided. The method includes, determining if a receive buffer has been full for a certain duration; and triggering an event if the duration varies from a threshold value.

In yet another aspect, a system for detecting congestion in a fibre channel switch element is provided. The system includes, a first counter that counts a duration for which a frame waits for transmission, and the duration is compared to a threshold value to detect congestion. The threshold value may be programmed by firmware used by the fibre channel switch element and if the first counter value is greater than the threshold value, an event is triggered.

In yet another aspect of the present invention, a system for detecting congestion at a receive segment of a fibre channel switch element is provided. The system includes, a receive buffer log that indicates how quickly frames are moving through the receive segment. The system also includes, a first counter that is incremented when a receive buffer is full and if the counter value varies from a threshold value, an event is generated; and a register that maintains count for frames that are routed to another switch element.

In yet another aspect of the present invention, a system for determining over-subscription in a transmit segment of a fibre channel switch element is provided. The system includes a first register that maintains information regarding a rate at which a source port can transfer data; a first counter that counts entries corresponding to a number of frames to be transmitted at a given time; and a second register that determines an over-subscription rate.

In yet another aspect of the present, a method for determining over-subscription in a transmit port of a fibre channel switch element is provided. The method includes, determining an over-subscription value based on a source port's data rate, a transmit port's data rate and an entry corresponding to a number of frames that are to be transmitted from the transmit port at a given time; and notifying a processor of the over-subscription rate if the over-subscription value is different from a threshold value.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"E-Port": A fabric expansion port that attaches to another Interconnect port to create an Inter-Switch Link.

"F_Port": A port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": A system which interconnects various ports attached to it and is capable of routing fibre channel frames by using destination identifiers provided in FC-2 frame headers.

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

"Port": A general reference to N. Sub.--Port or F.Sub.--Port.

"L_Port": A port that contains Arbitrated Loop functions associated with the Arbitrated Loop topology.

"N_Port": A direct fabric attached port.

"NL_Port": A L_Port that can perform the function of a N_Port.

"Over subscription": is defined herein as data arriving at a Fibre Channel transmit port faster than the port can transmit it. It is noteworthy that the over subscribed transmit port itself may not be congested and may be sending at its full data rate. But an over subscribed transmit port will cause congestion at the ports that are sending frames routed to the oversubscribed port.

"Switch": A fabric element conforming to the Fibre Channel Switch standards.

"VL": Virtual Lane: A portion of the data path between a source and destination port.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
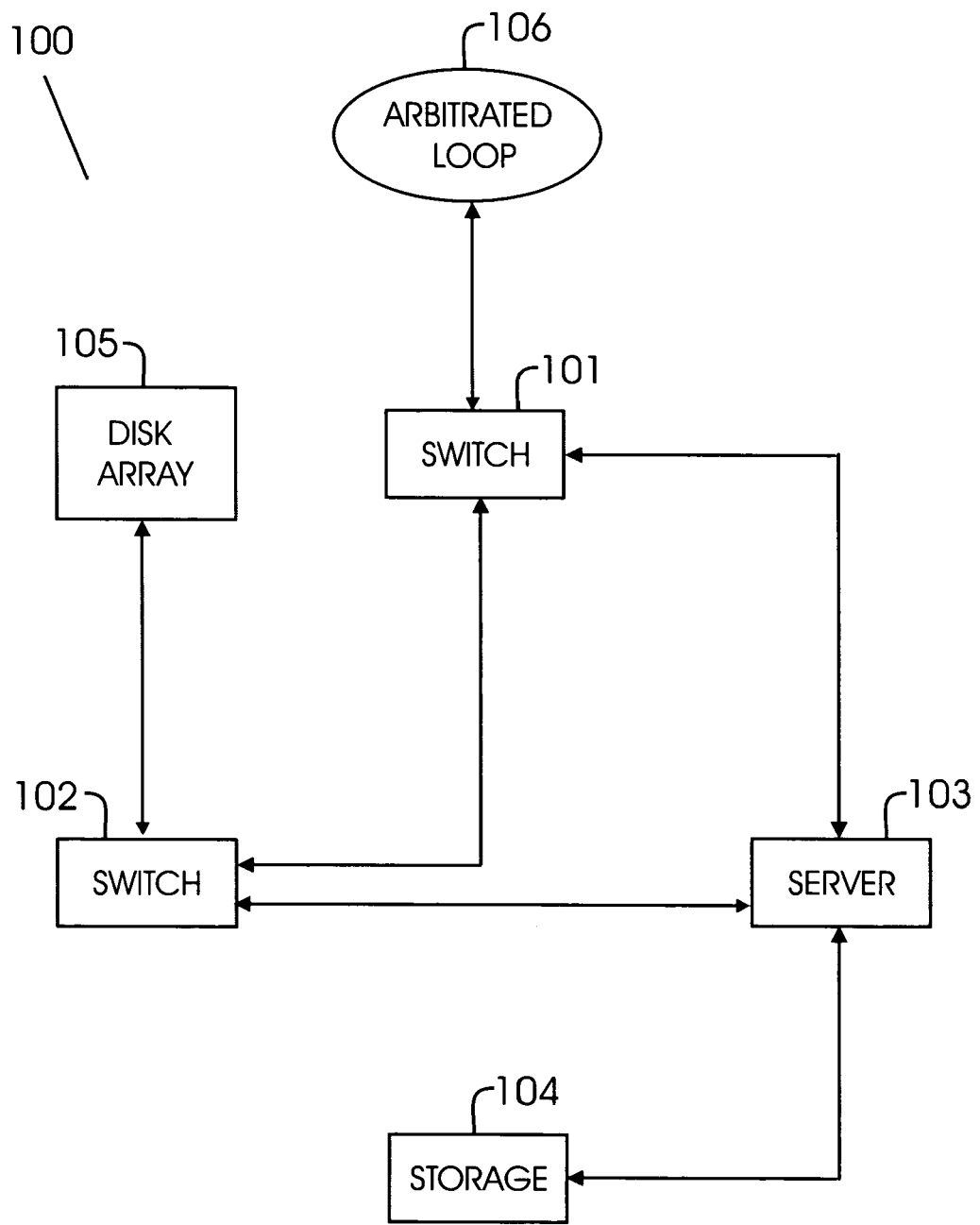
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
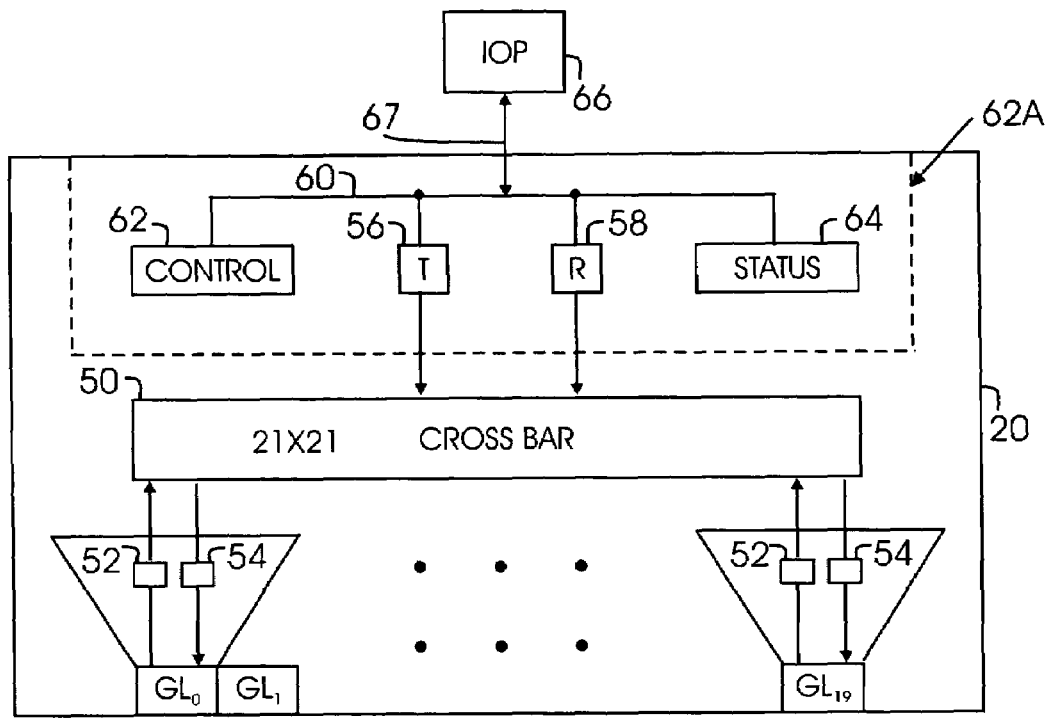
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
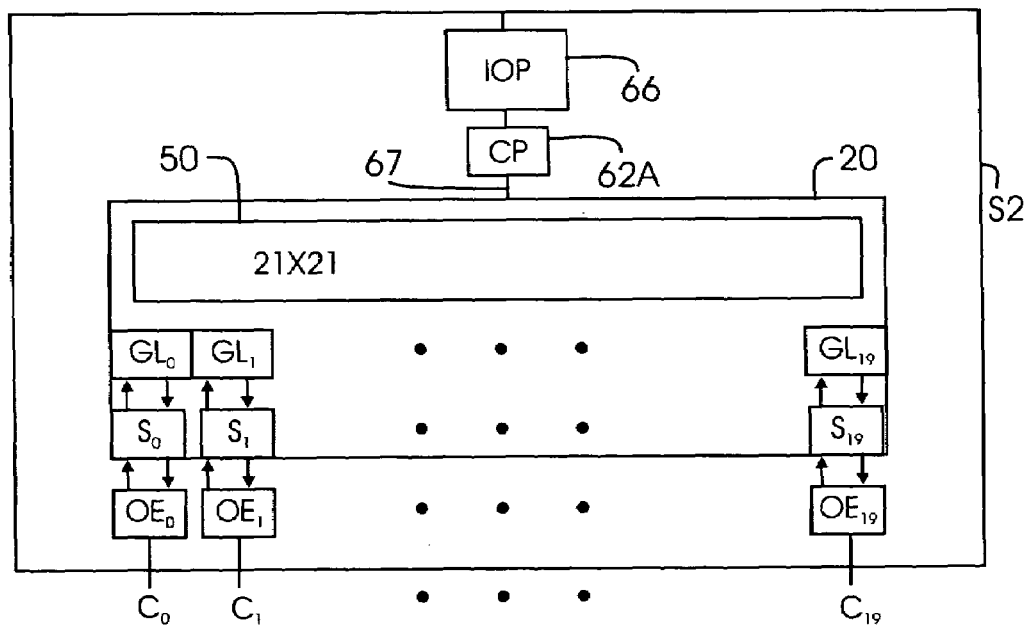
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
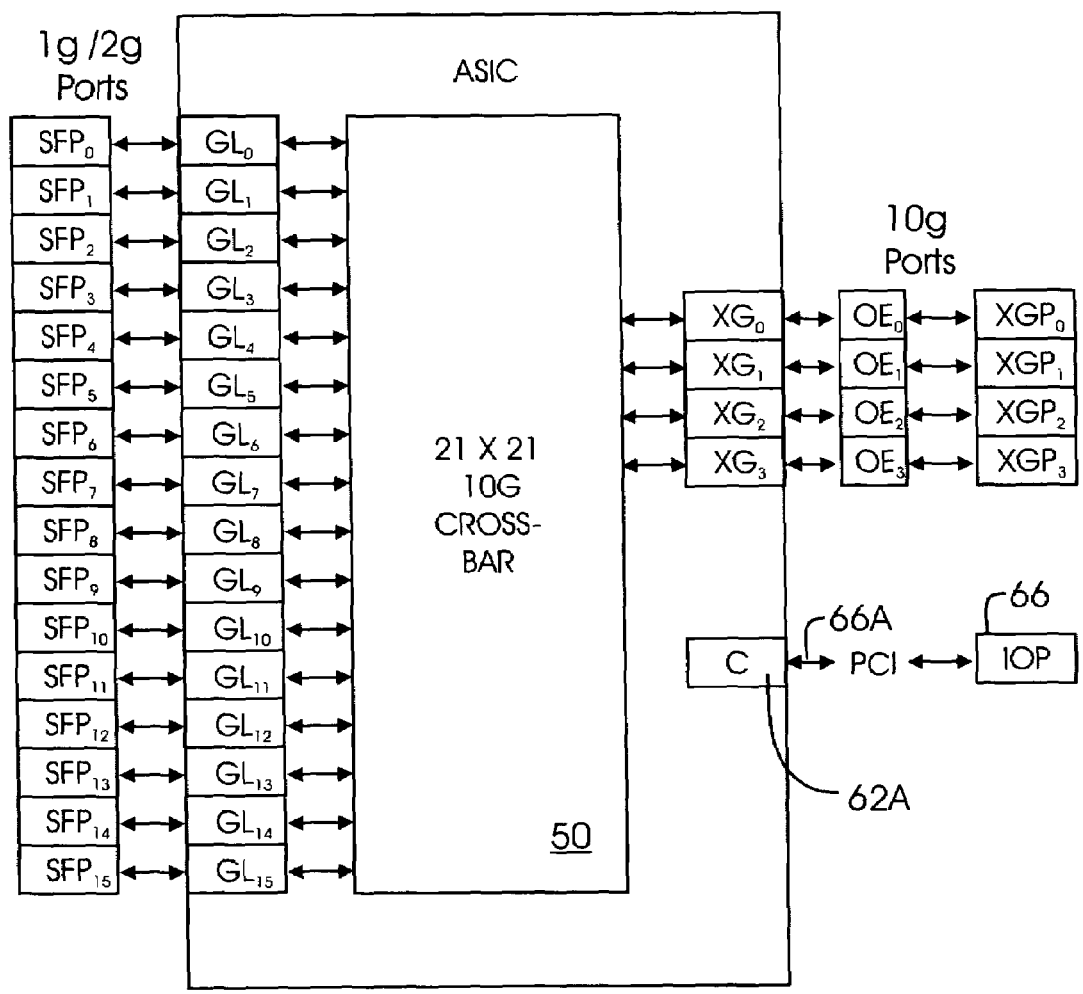
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A.

Figures 1, 1E:
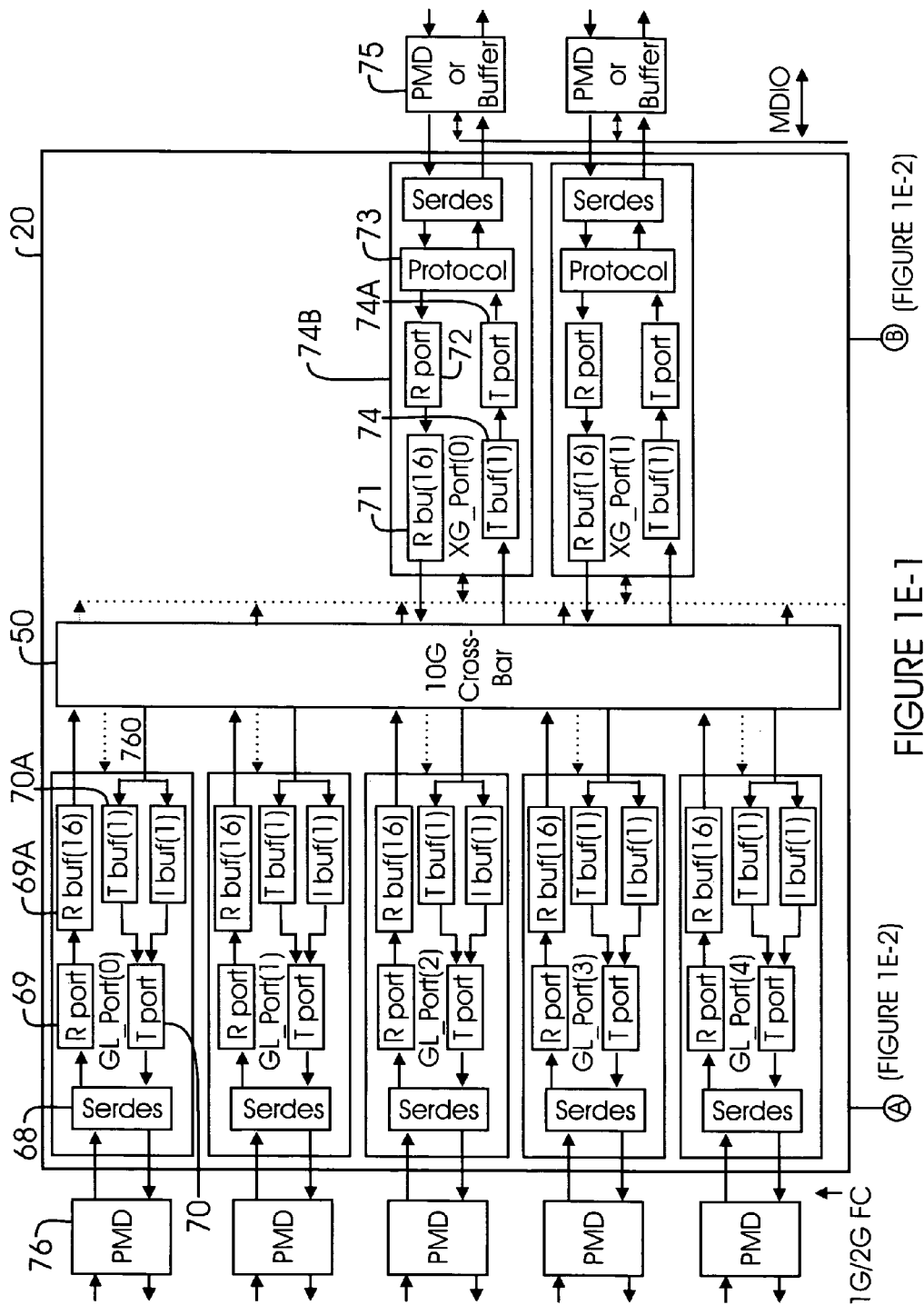
FIGS. 1E-1/1E-2 (jointly referred to as FIG. 1E) show another block diagram of a Fibre Channel switch element with sixteen GL_Ports and four 10 G ports, according to one aspect of the present invention.
Figures 1, 1E, 2:
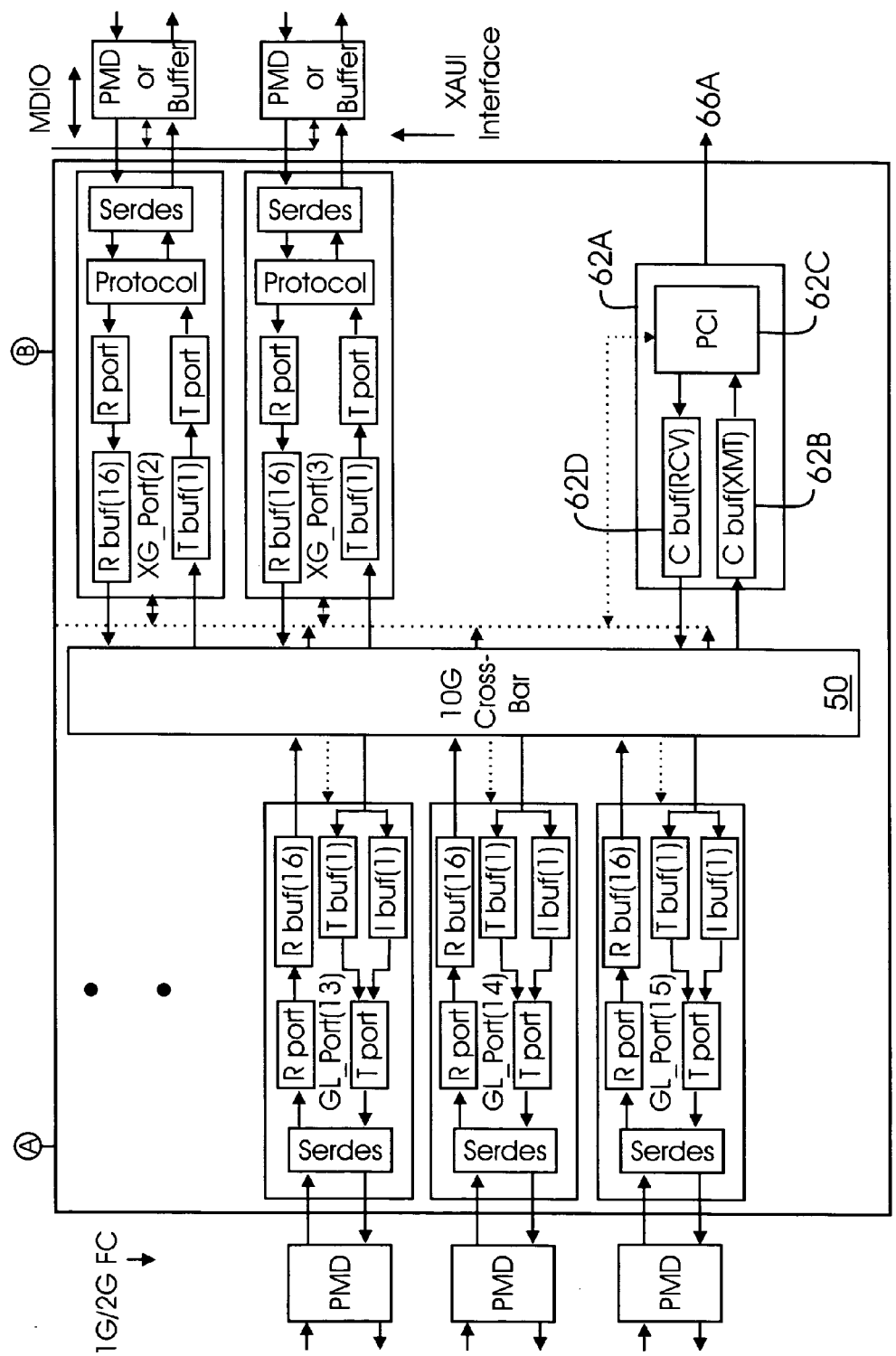
FIG. 2 show a topology highlighting congestion and over-subscription in Fibre Channel networks.
Figure 2:
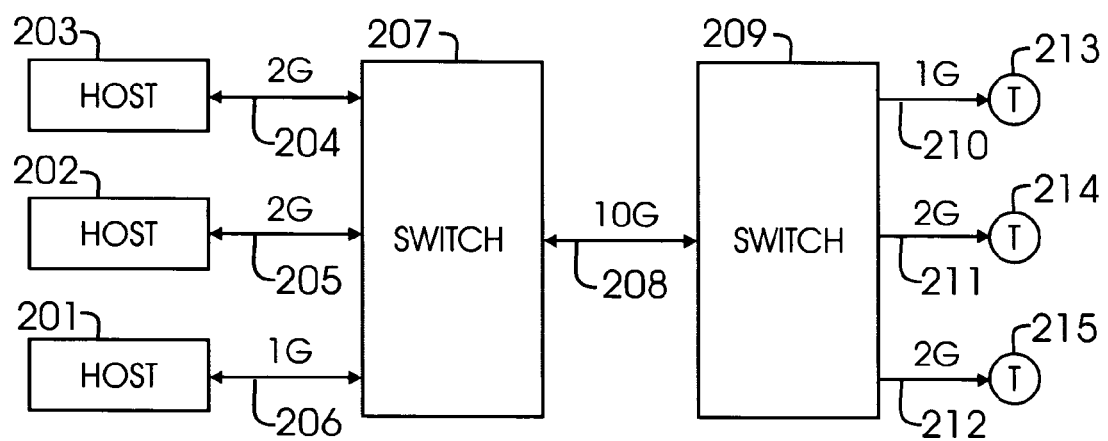

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
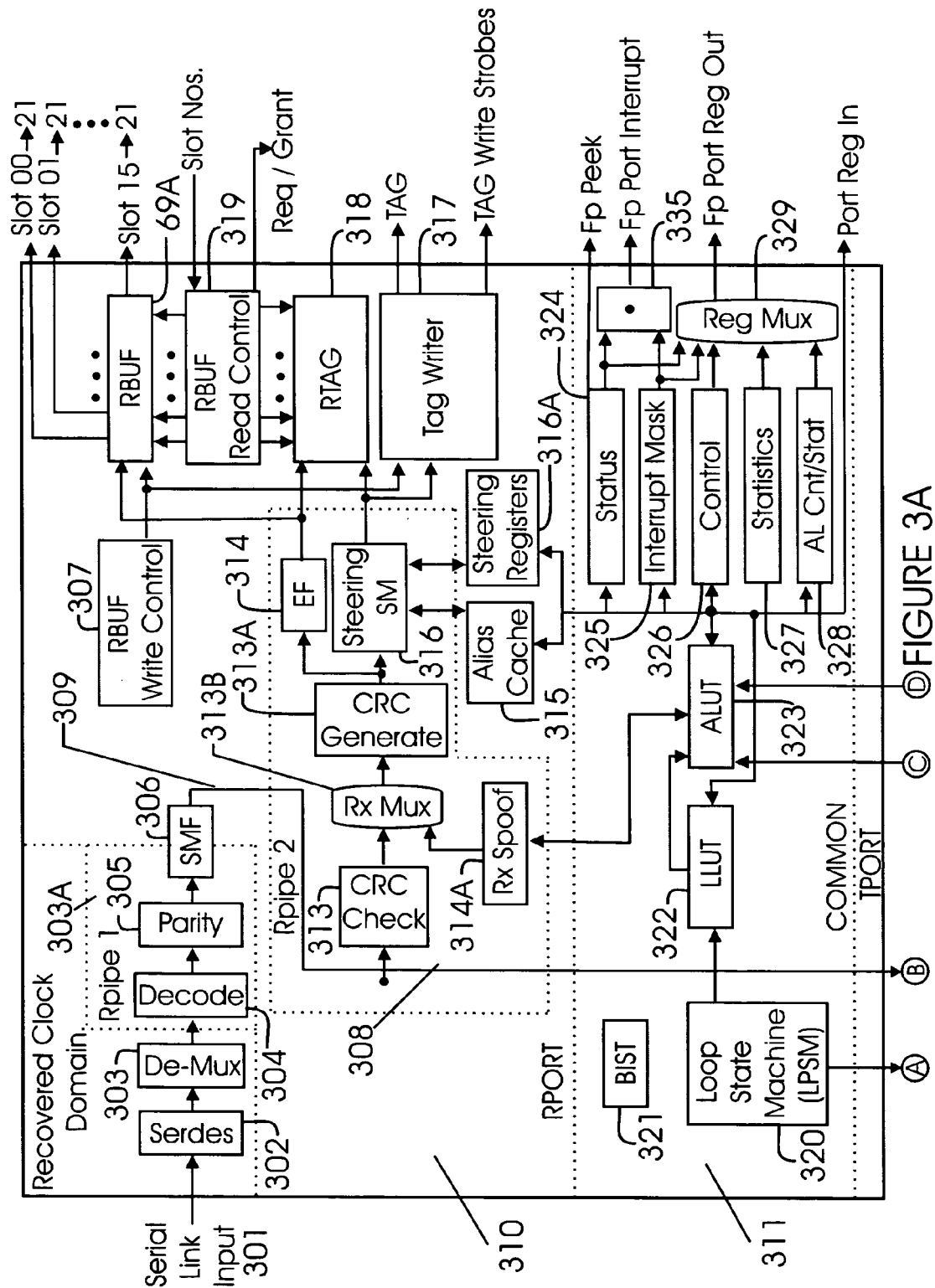
FIGS. 3A/3B (jointly referred to as FIG. 3) show a block diagram of a GL_Port, according to one aspect of the present invention.
Figure 3B:
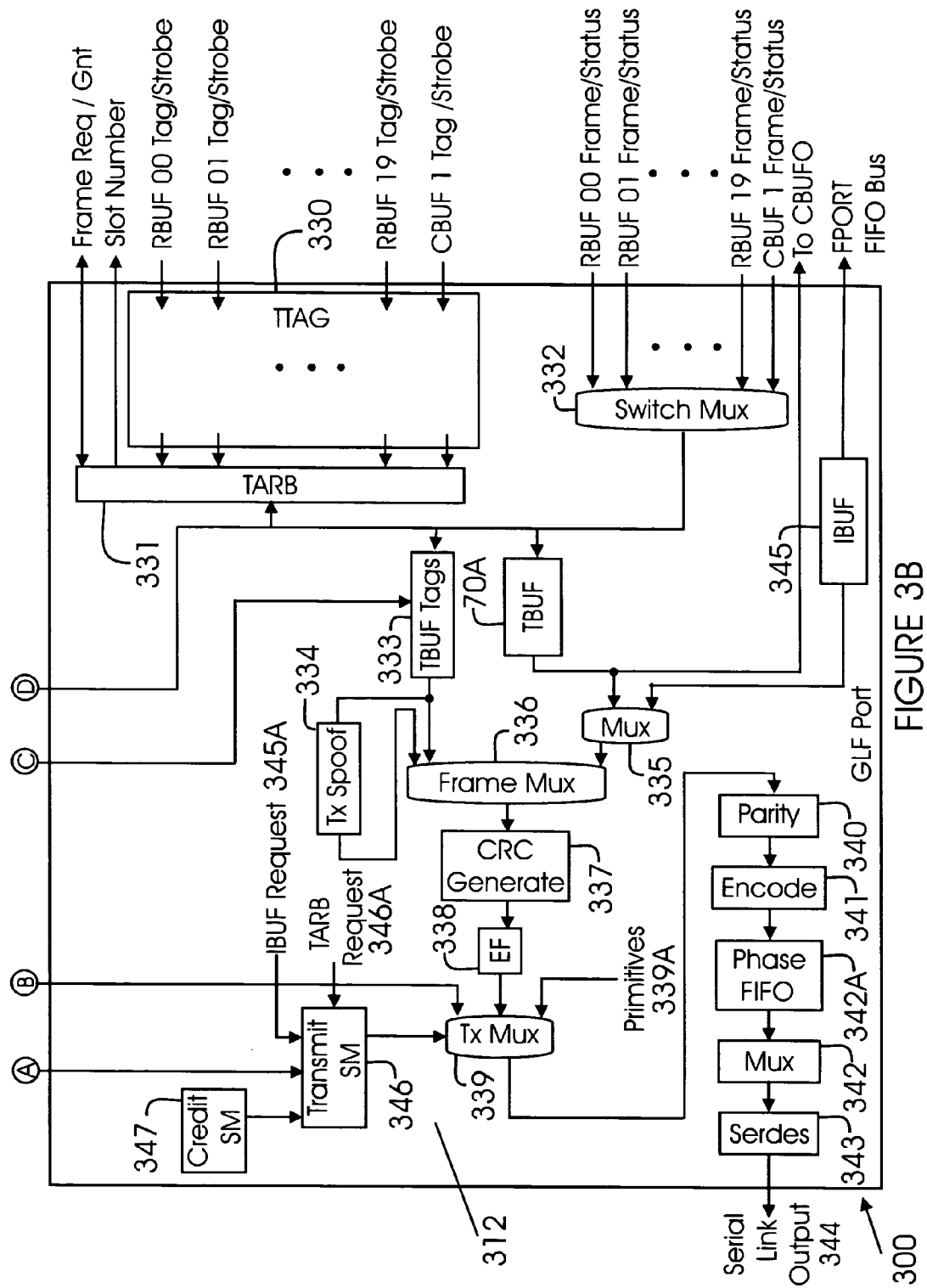

GL Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT) 312 and common segment 311.

Receive Segment of GL Port:

Frames enter through link 301 and SERDES 302 converts data into 10-bit parallel data to fibre channel characters, which are then sent to receive pipe ("Rpipe" or "Rpipe1" or "Rpipe2") 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer 313B, CRC generate module 313A and EF (external proprietary format) module 314. EF module 314 encodes proprietary (i.e. non-standard) format frames to standard Fibre Channel 8B codes. Mux 313B receives input from Rx Spoof module 314A, which encodes frames to a proprietary format (if enabled). RWT 307 controls RBUF 69A write addresses and provide the slot number to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX ("TxMux") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexor ("Frame Mux" or "Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG Port

Figure 4A:
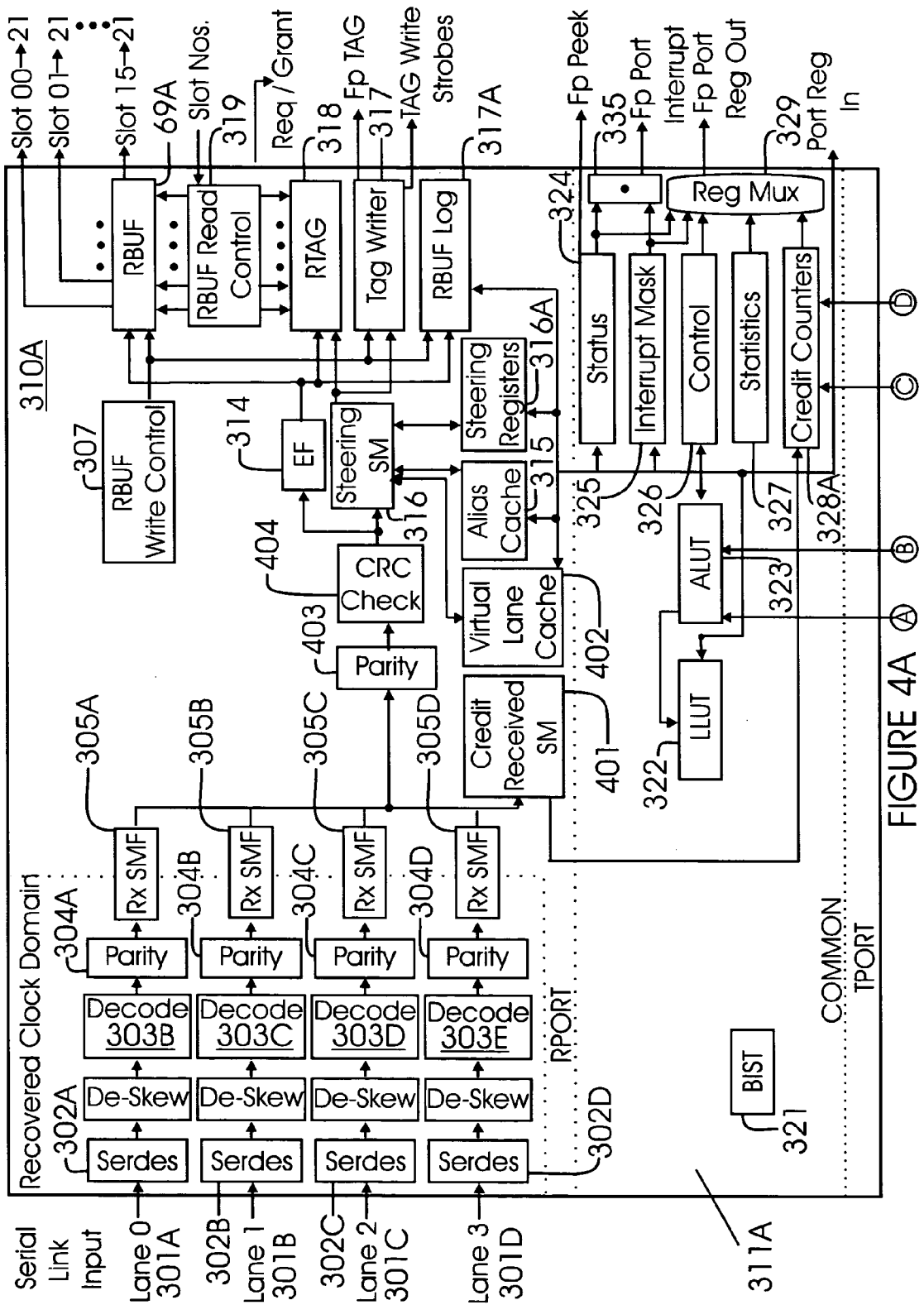
FIGS. 4A/4B (jointly referred to as FIG. 3) show a block diagram of XG_Port (10 G) port, according to one aspect of the present invention.
Figure 4B:
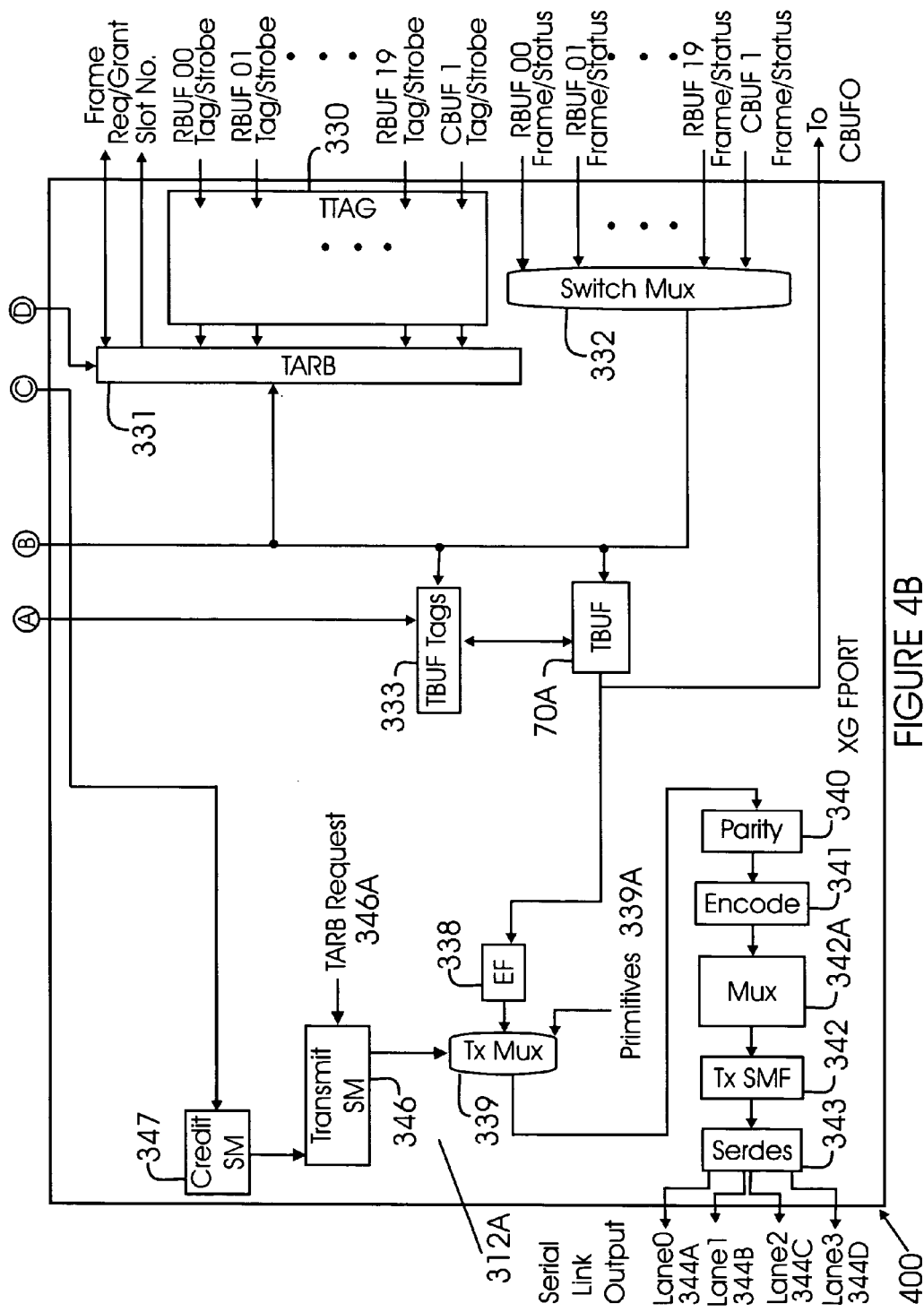

FIGS. 4A-4B (referred to as FIG. 4) show a block diagram of a 10 G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a smoothing ("TxSMF") module 342 that handles clock variation on the transmit side. SERDES 343 then sends the data out to the link.

Congestion Detection:

In one aspect of the present invention, the following set of counters and status registers can be used to detect congestion, both at the transmit and receive side.

TPORT Congestion:

The following describes various registers/counters that are used to detect congestion at TPORT 312A:

"Transmit Wait Count Register": This register increments each time a frame is available for transmission but cannot be transmitted due to lack of credit. This time interval may be the time needed to transmit, for example, one word (32 bits).

"Transmit Wait Count Rollover Event": This status event is set when the transmit wait count register rolls over from its maximum value to zero. This can be set to cause an interrupt to IOP 66.

"Transmit wait Count Threshold Register"(FIG. 5, 508): This register contains a count that is compared to the transmit wait count threshold counter value. IOP 66 can program the register.

"Transmit Wait Count Threshold Counter"(FIG. 5, 507): This register increments each time a frame is ready to be transmitted but cannot due to lack of credit. It decrements each time the above condition is not true. If the counter is at its maximum value, then it does not increment. If the counter is at zero, then it does not decrement.

"Transmit Wait Count Threshold Event Status": This event occurs when the transmit wait count threshold counter value exceeds a threshold value programmed in the transmit wait count threshold register (508). This denotes that frames have been waiting to transmit based on a threshold value. The event can be used to trigger an interrupt to IOP 66.

"Congestion count adjustment" (FIG. 5, modules 513 and 514, & FIG. 10): Logic modules 513 and 514 allow the rate of counting up or down to be adjusted with a programmed value. Module 513 adjusts the rate of counting up, while module 514 adjusts the rate of counting down.

Figure 5:
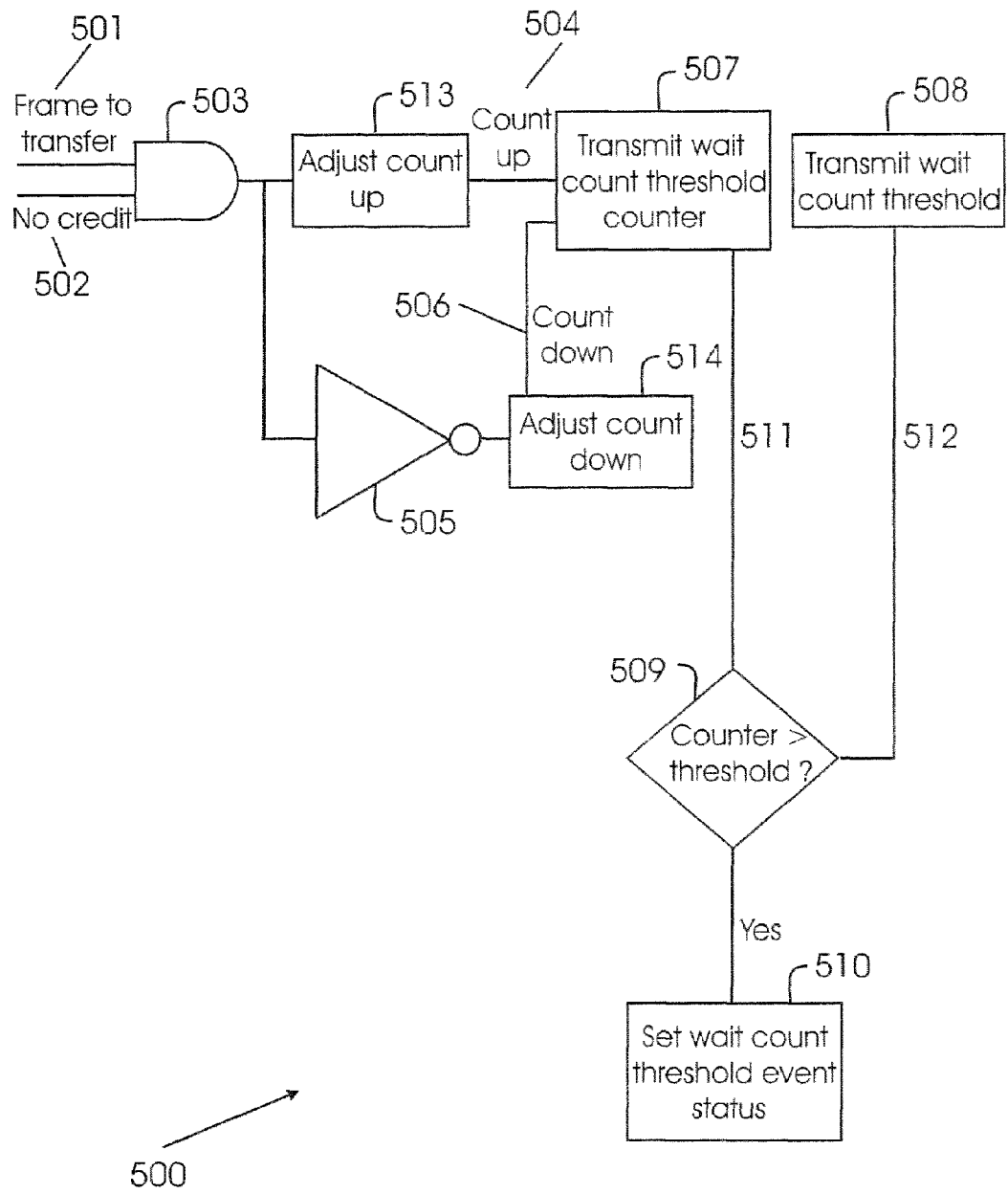
FIG. 5 shows a block diagram of the plural counters and registers at a transmit port, according to one aspect of the present invention.

FIG. 5 shows a block diagram of the plural counters and registers at TPORT 312A that have been described above. FIG. 5 shows signal 501 to transfer frames and a "no credit" signal 502. Signal 501 and 502 are sent to logic 503. A count up signal 504 (from logic 513) and count down signal 506 (from inverter 505) are sent to transmit wait threshold counter 507. Counter 507 is incremented for each period a frame is ready to be transmitted (signal 501) and cannot be transmitted due to lack of credit (signal 502). This period could be set to the amount of time required to transmit one word of the frame.

Register 508 includes a threshold value that can be programmed by IOP 66 using the firmware (or hard coded). Register 508 output 512 and counter 507 output 511 is compared (by logic 509), and if the counter value (511) is greater than the threshold value (512) then the threshold wait count event is set, which results in an interrupt to IOP 66 (510).

To extend the range of values that can be compared without having to increase the number of bits for threshold count in module 508, compare module 509, and counter 507 include more bits than the threshold count. Then counter output 511 is shifted down by a programmable number of bits. For instance, if counter 507 is 2 bits longer than threshold count 508, then shifting counter output 511 is shifted down 1 or 2 bits, divides the counter output by 2 or 4, making the range available for the threshold count larger by a factor of 2 or 4, but losing precision in the lowest 1 or 2 bits of the counter.

Figure 10:
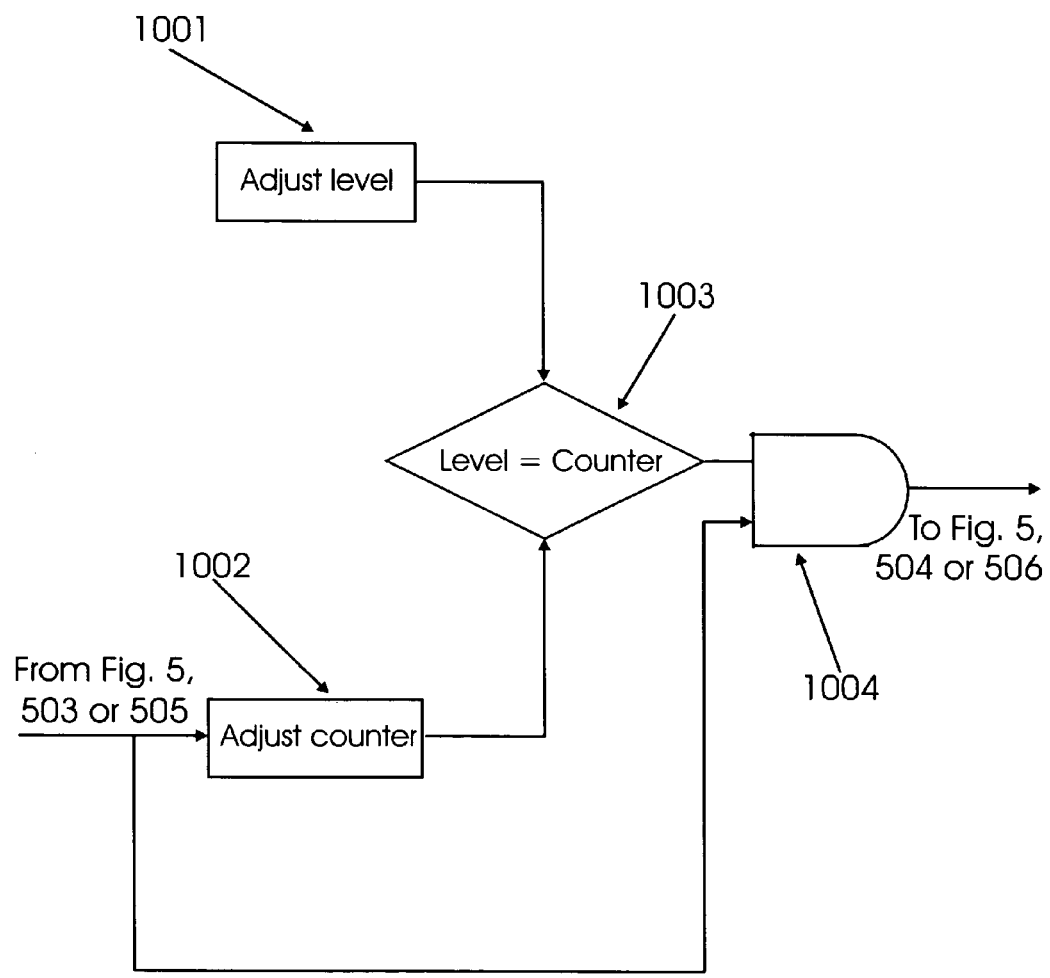
FIG. 10 shows how a counter adjustment is used, according to one aspect of the present invention.

FIG. 10 shows how counter adjustment is used to change the rate when the wait count goes up or down. The adjust level module 1001 is programmed by firmware to include a certain adjustment level value. The adjust counter 1002 is incremented whenever a count up signal (if adjusting count up from FIG. 5, 503) or count down signal (if adjusting count down from FIG. 5, 505) is set. The values in modules 1001 and 1002 are compared by module 1003, with the output set, if 1002 is greater than or equal to 1001.

The output of module 1003 is "ANDED" with the original signal by 1004 to provide the "adjusted count up" or "count down" output. The adjusted count rolls over when incremented past its maximum (depending on number of bits in count). The result is to change the rate of count up or count down, depending on the adjusted level value and the number of bits in the counter. If there are n bits in the counter, the rate of count signals is modified as follows:

$$C = r*(1-(a/2**n))$$

Where C is the effective count rate (rate of signals in FIG. 5, 504 or 506), r is the raw count rate (rate of signals in FIG. 5 from 503 or 505), and "a" is the programmed adjust level from module 1001, which is less than 2**n. In one aspect of the present invention, a 4 bit counter is used for most cases, although the invention is not limited to any particular bit size or counter value.

Figure 6:
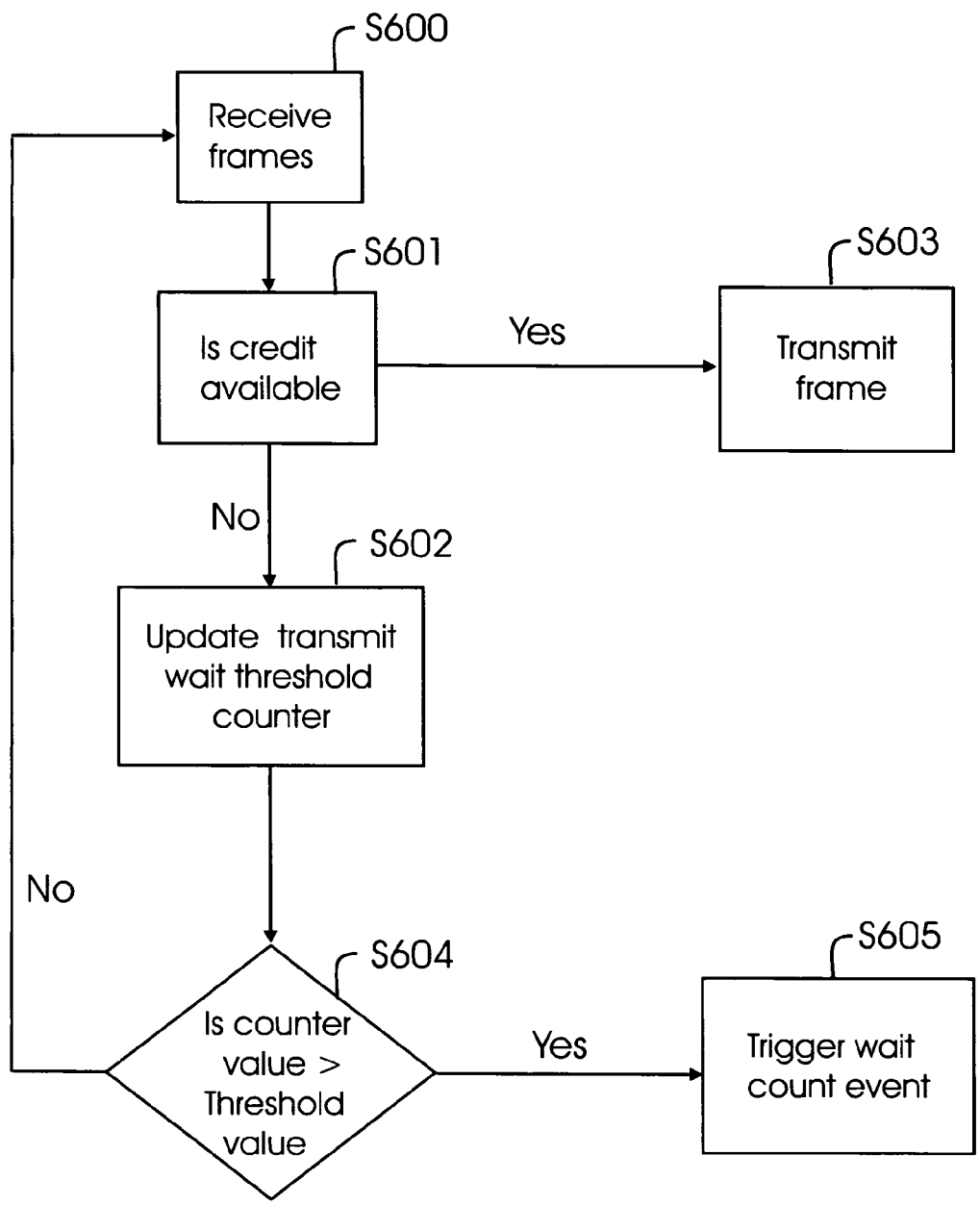
FIG. 6 shows a process flow diagram for detecting congestion on the transmit side, according to one aspect of the present invention.

FIG. 6 is a flow diagram of executable steps for detecting congestion on the transmit side (TPORT 312A), according to one aspect of the present invention.

In step S600, frames (or signal to transmit frames) are received for transmission. In step S601, the process determines if credit is available to transmit the frame. If credit is available, then in step S603, the frame is sent and counter 507 is decremented or cleared.

If no credit is available, then in step S602, counter 507 is incremented.

In step S604, the process compares counter 507 value 511 to a threshold value 512 that can be programmed by firmware in register 508. If the counter value 511 is greater than threshold value 512, then in step S605, a wait count event is triggered. This can be an interrupt to IOP 66 and denotes congestion.

If counter value 511 is less than threshold value 512, then the process goes back to step S601.

RPORT Congestion:

The following describes various registers/counters that are used to detect congestion at RPORT 310A:

"Receive Buffer Full Status": This status is set when all buffers (RBUF 69A) for a port are full.

If the credit mechanism per Fibre Channel standards is operative then TPORT 312A cannot transmit because of lack of credit. This status can be programmed by firmware to cause an interrupt for IOP 66.

"Receive Buffer Full Threshold Register" (FIG. 7, 706): This register maintains a count that is compared to "Receive Buffer Full threshold Counter" value.

"Receive Buffer Full Threshold Counter" (FIG. 7, 705): This counter is incremented every time the receive buffers (69A) are full. The counters decrement when the buffer is not full. If the counter is at its maximum value, it stops incrementing. If the counter is at zero, it stops decrementing.

"Receive Buffer Full Threshold Event Status" (709): This event happens if the receive buffer full threshold counter value exceeds the programmed (or hard coded) receive buffer full threshold register value. This occurs if received frames cannot be moved to their destination for a certain period. This event can be used to generate an interrupt for IOP 66.

"Receive Buffer Log": A buffer log can be kept in RBUF 69A. The log includes the upper 16 bits of the source and destination addresses (S_ID and D_ID) of the frames that are received in RBUF 69A, and the status indicating if data is valid. If the frames are forwarded rapidly, the log values will change quickly. However, due to congestion, if frames do not move quickly, then these values do not change rapidly. Sampling the log values provides a statistical sample of frame sources and destinations at a port. The log allows identifying the destination(s) that are congested. The log can be sent upstream to a device so that the upstream device can alter routing based on congestion.

"E-Port Frame In Count Register": This register located in CPORT 311A, counts received frames that are routed to an E_Port to go to another switch. By comparing this register count to the overall received frame count at a port; the percentage of frames going to another switches, versus local destinations can be determined.

Figure 7:
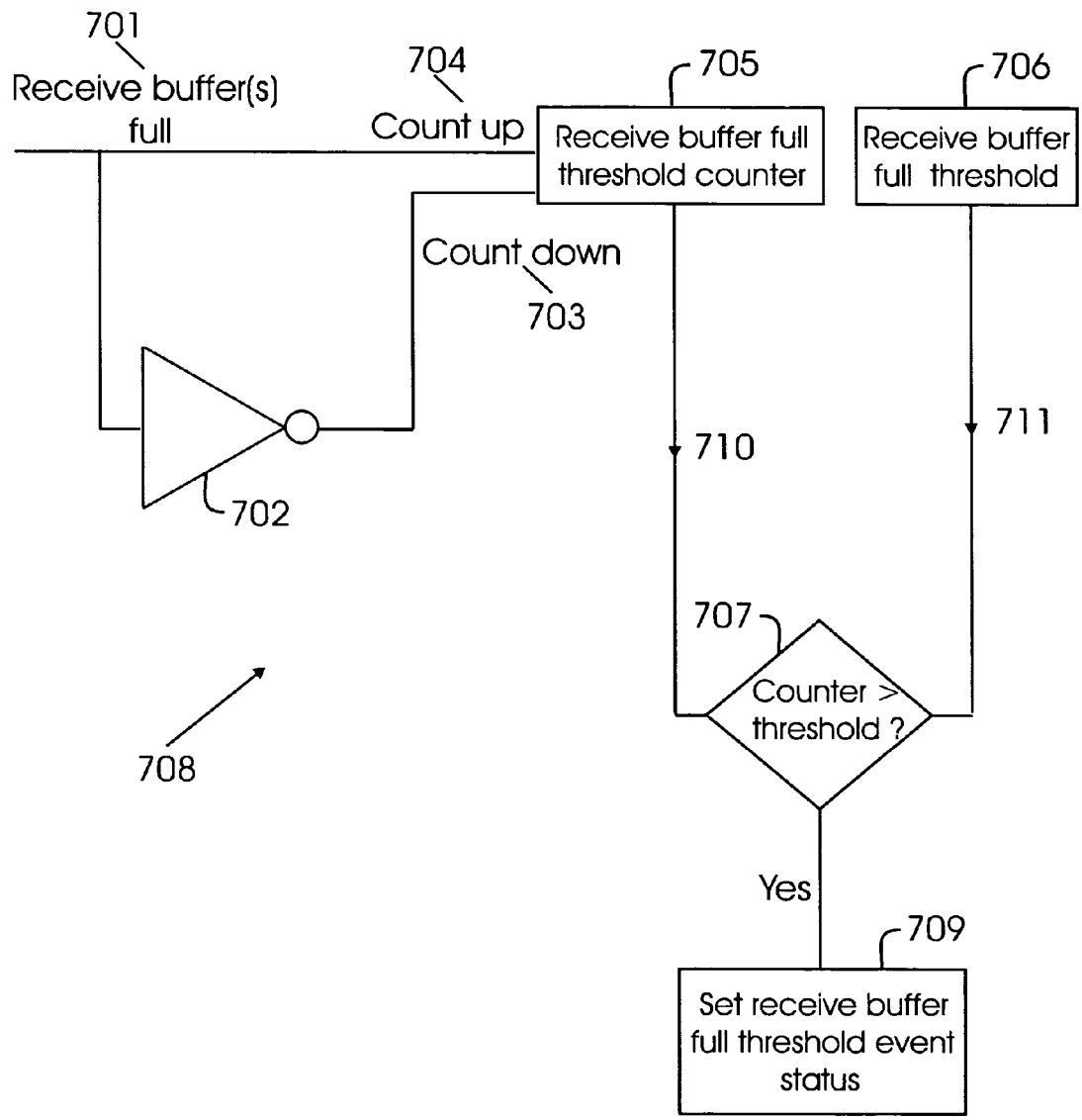
FIG. 7 is a block diagram of a system with the registers/counters used according to one aspect of the present invention to detect congestion.

FIG. 7 is a block diagram of system 708 showing the registers/counters used according to one aspect of the present invention to detect congestion. A receive buffer full signal 701 is received and based upon that (count up signal 704) counter 705 is incremented. Counter 705 is also decreased (signal 703 received via inverter 702) when a frame leaves the receive buffer.

Register 706 can be programmed with a threshold value by firmware. Counter 705 generates a value 710 that is compared with register 706 threshold value 711. If counter value 710 is greater than threshold value 711, then a "receive buffer full" event is triggered (709). This can be used to generate an interrupt for IOP 66.

Figure 8:
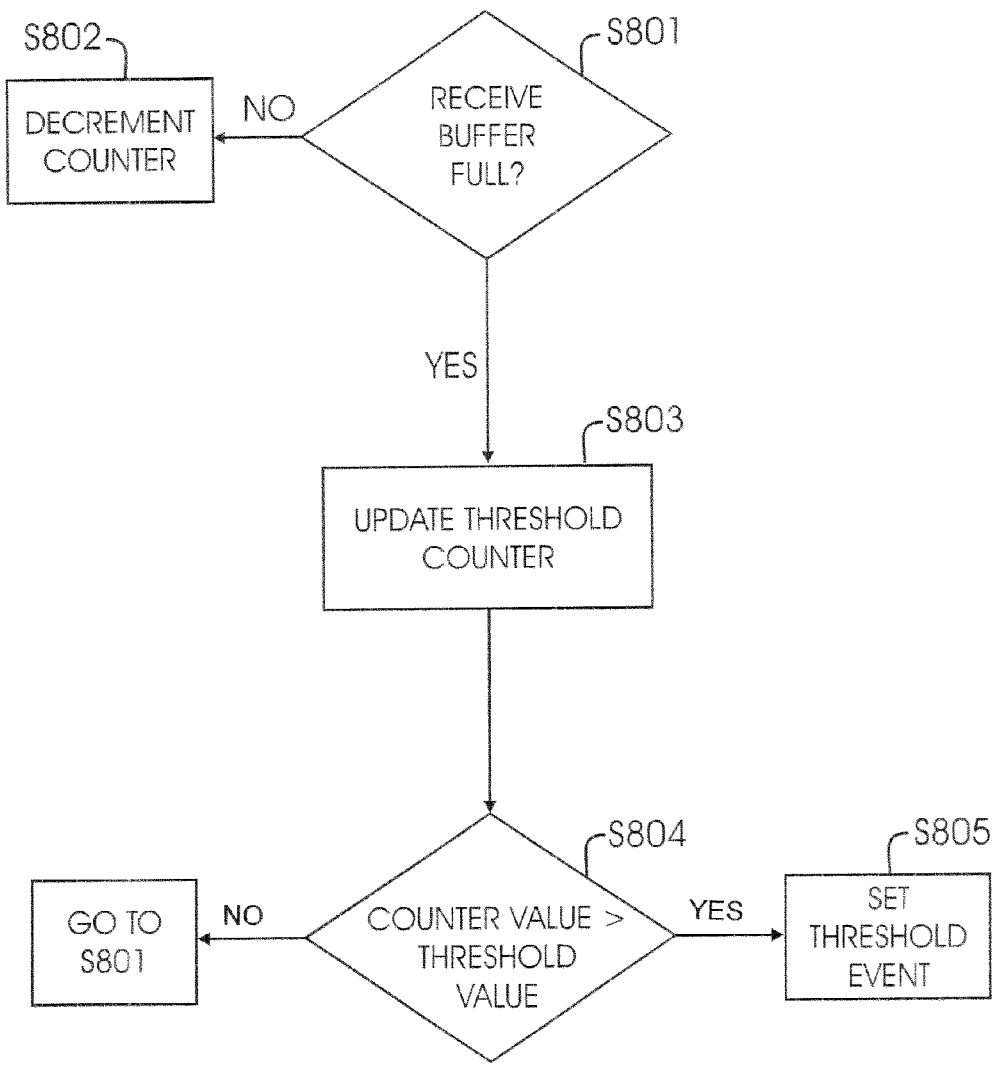
FIG. 8 shows a flow diagram of a process flow diagram for detecting congestion at a receive port, according to one aspect of the present invention.

FIG. 8 shows a flow diagram of a process flow diagram for detecting congestion at RPORT 310A, according to one aspect of the present invention. In step S801, the process determines if the receive buffer is full. If the buffer is not full, then in step S802, counter 705 is decremented.

If the buffer is full, then in step S803, counter 705 is incremented.

In step S804, counter 705 value 710 is compared with threshold value 711. If the counter value 710 is greater than threshold value 711, then a threshold event is set in step S805, otherwise, the process goes back to step S801.

Figure 9A:
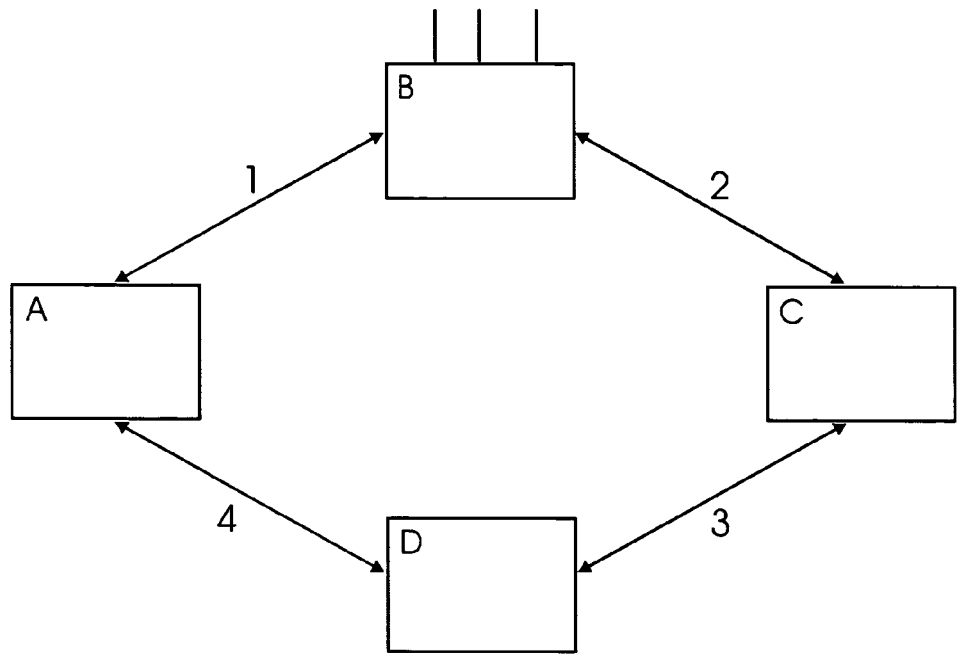
FIGS. 9A-9B show examples of how the adaptive aspects of the present invention are used to minimize congestion.
Figure 9B:
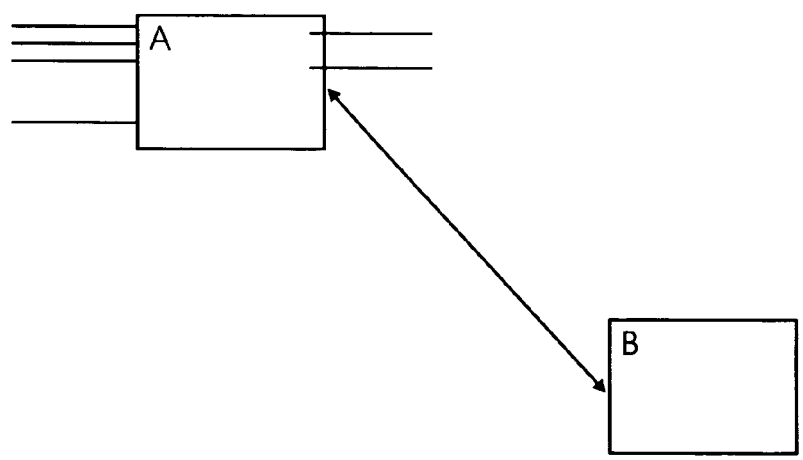

FIGS. 9A-9B show examples of how the adaptive aspects of the present invention can be used. In FIG. 9A, if some local ports in switches A and B send large amount of data to switch C, and most of the traffic uses link 1 between A and C passing through switch B. Link 2 does not have enough bandwidth for the traffic. In this scenario, the E-Port on switch B-side of link 1 and the local ports on switch B sending to switch C will get receive buffer full threshold events. The E-Port on the side of switch A side of link 1 will get transmit wait count threshold events.

Based on the foregoing adaptive aspects of the present invention, one possible improvement would be to route traffic from A to C over link 3 or to add another link between switches B and C. These improvements are possible because the various counters and registers above can detect congestion in the links.

FIG. 9B shows that local ports on Switch A get receive buffer full threshold events. The E_Port "frame in count" for those local ports can be sampled and compared to the total received frame count. If most frames are going from switch A to switch B, congestion can be relieved by adding links between switches A and B. If most of the frames are going to local destinations, then performance is not limited by the switch fabric, but by the number of devices being used.

Over Subscription Detection:

The following describes various registers/counters that are used to detect over subscription at TPORT 312A. In one aspect, the register/counters are implemented in TTAG 330:

"Port Rate" register: This register includes the receive speed of the source port associated with that TTAG FIFO.

"Port TTAG Entry Count" counter: This counter provides the number of TTAG FIFO entries representing frames to be transmitted, currently in the TTAG FIFO for a source port.

"Calculate Over Subscription" Register: This register calculates the amount of over subscription by multiplying the port TTAG entry count by the source port rate, adding the result for all ports, then dividing the total by the transmit port's speed rate. If there are n source ports, and if Rx is the rate of source port x, Fx is the number of frames in the TTAG FIFO, and T is the transmit rate for the transmit port, then over subscription is provided by:

$$((R0*F0)+(R1*F1)+\ldots(R(n-1)*F(n-1)))/T$$

"Threshold" Value: This value is programmed by firmware and is compared to the calculated over subscription value. If the calculated over subscription value is greater than or equal to the threshold value, then the over subscription status is set. The status is used by firmware and may cause an interrupt for IOP 66.

Figure 11:
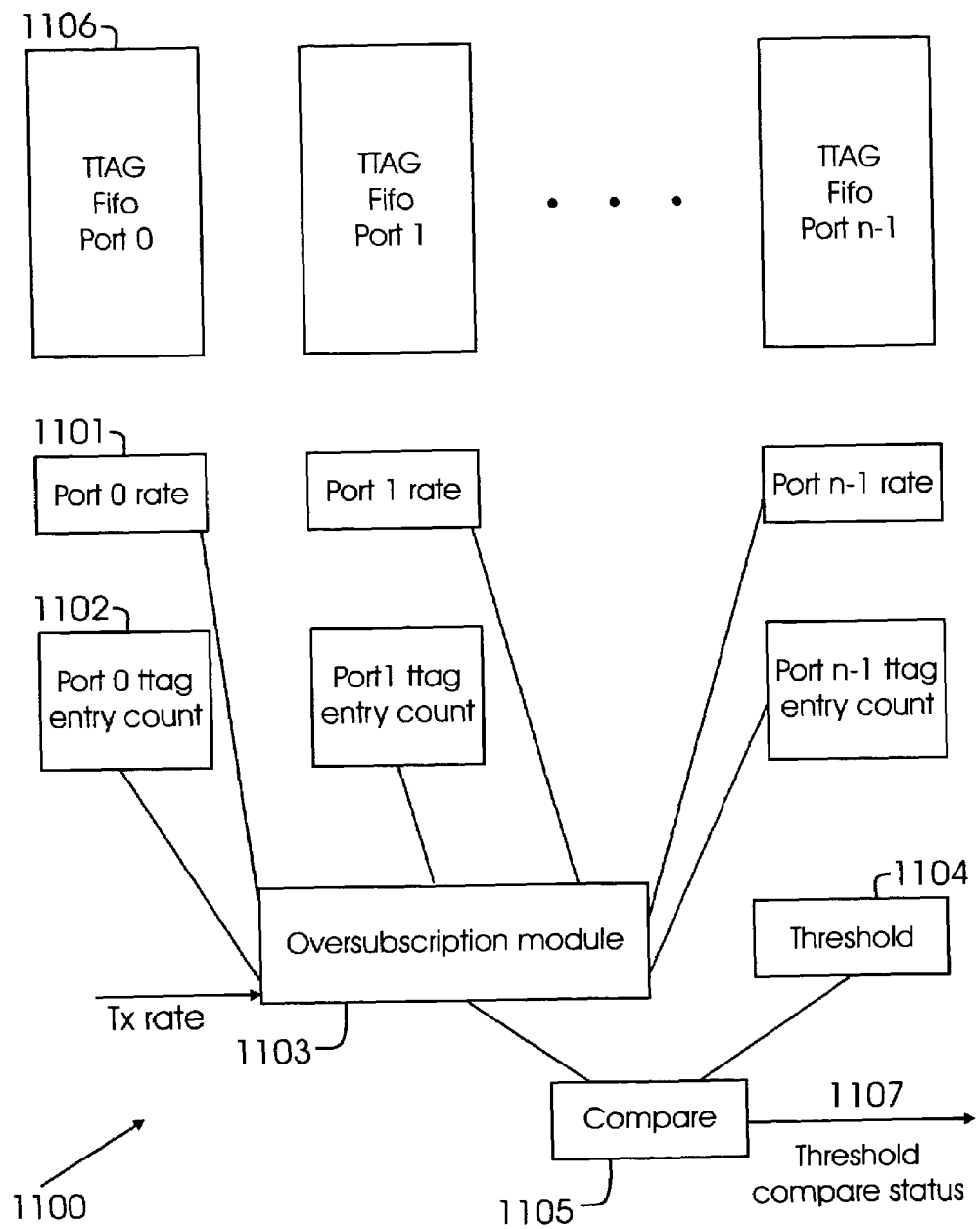
FIG. 11 is a block diagram of an over subscription detection system/logic, according to one aspect of the present invention.

FIG. 11 is a block diagram of the over subscription detection system/logic 1100. System 1100 may be located in TTAG 330. Each TTAG FIFO 1106 includes entries representing frames from a particular source port ready for transmission. Port rate 1101 includes the rate corresponding to a particular source port. The port TTAG entry count 1102 contains the number of TTAG FIFO entries for a particular source port. To calculate over subscription, module 1103 calculates the sum of the products of each port's TTAG count and rate, and divides the sum by the transmit port speed rate. Compare module 1105 compares the result from module 1103 with the programmed threshold value in module (or register) 1104. If module 1103 output is greater than the threshold value in module 1104, a status signal 1107 is set.

If integer arithmetic is used, any result of the over subscription calculation between 1 and 2 may be rounded down to 1. To increase precision, the sum of the products of the port TTAG counts and rates can be shifted up by 2 or 3 bits (multiplying by 4 or 8) before the division by the transmit rate. Over subscription is determined by:

$$(((R0*F0)+(R1*F1)+\ldots(R(n-1)*F(n-1))*4)/T$$

The value selected from module 1104 takes the foregoing into account.

Figure 12:
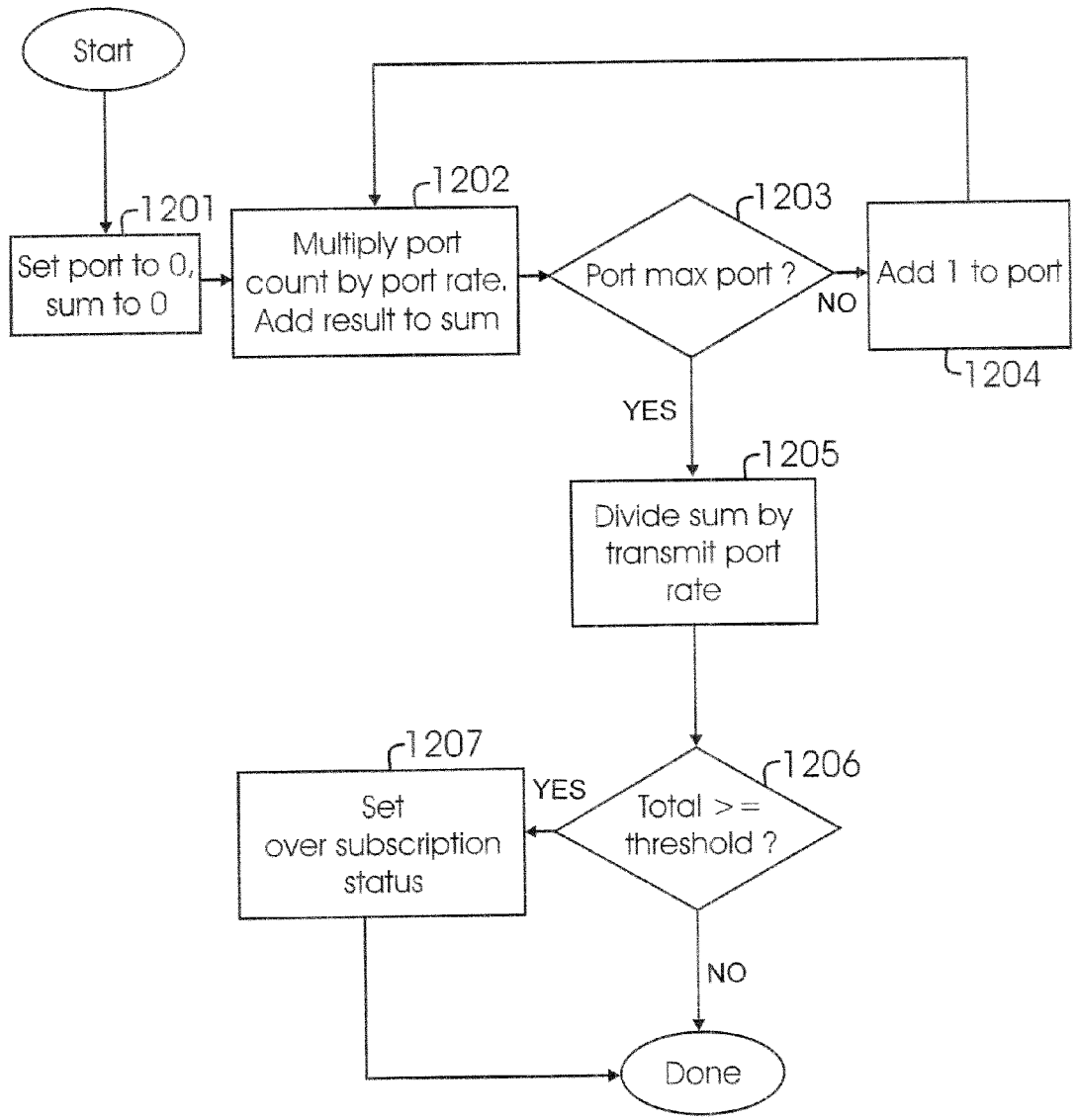
FIG. 12 shows a flow diagram for determining over subscription, according to one aspect of the present invention.

FIG. 12 shows a flow diagram for determining over subscription. Step 1201 initializes the calculation. Step 1202 calculates the product of the TTAG FIFO count and the rate for a source port, and is repeated for each port by going through steps 1203 and 1204 until all ports have been added. Step 1205 finishes the calculation by dividing the sum by the transmit port rate. The compare in step 1206 causes the over subscription status to be set in step 1207 if the calculated number is greater than the programmed threshold.

The raw values i.e., (R0*F0) . . . (R(n−1)*F(n−1)) are available to IOP 66 as status and used in the determination of which ports have how much over subscription.

It is noteworthy that the term "signal" as used in the foregoing description includes firmware/software commands.

In one aspect of the present invention, congestion can be detected in fibre channel switches and routing changes can be made to improve the overall performance of the networks.

Figure 13:
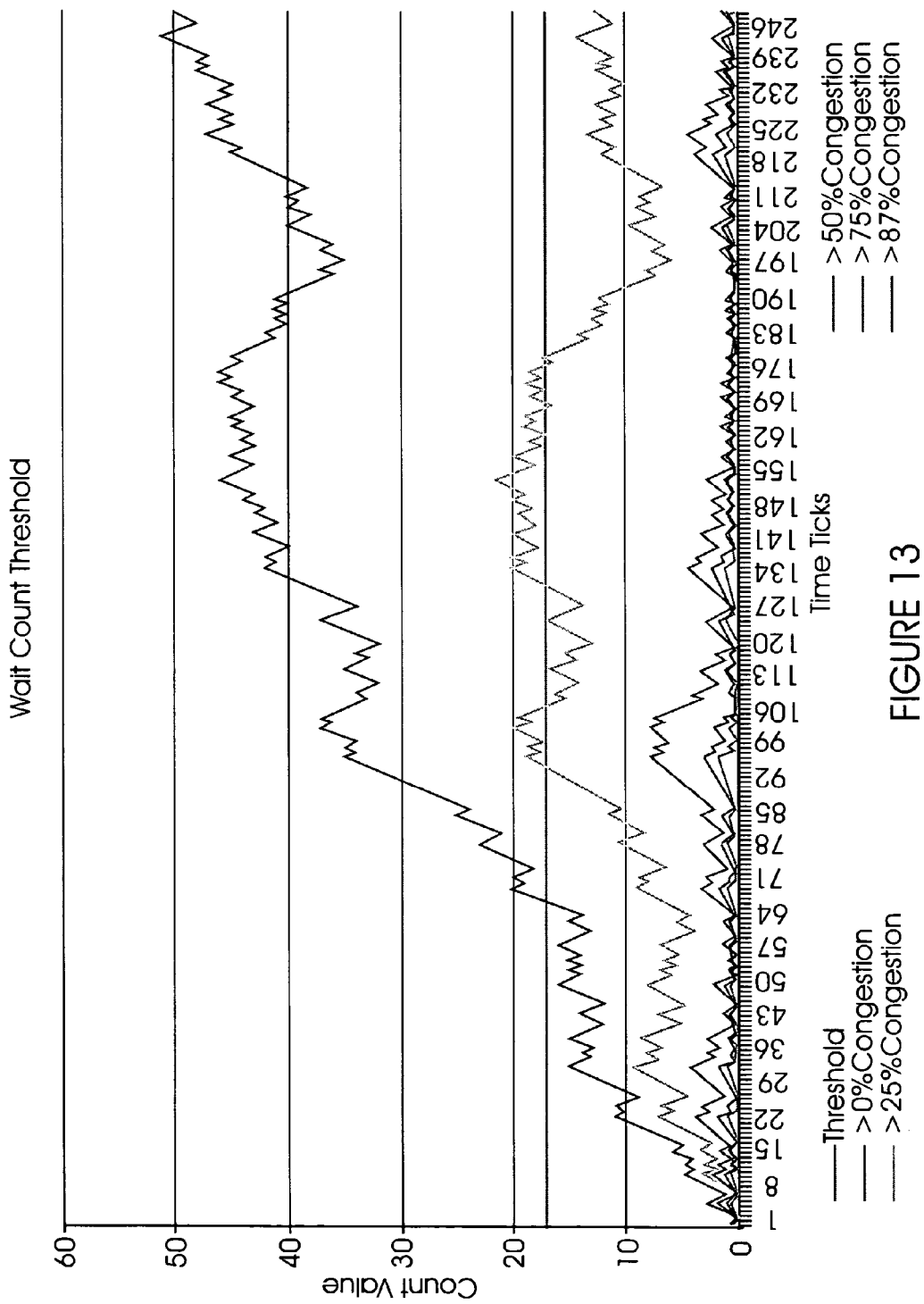
FIG. 13 provides a graphical illustration of how the adaptive aspects of the present invention assist in improving congestion management in Fibre Channel networks.

FIG. 13 provides a graphical illustration of how the foregoing adaptive aspects of the present invention assist in improving congestion management.

Although the present invention has been described with reference to specific embodiments, these embodiments are illustrative only and not limiting. Many other applications and embodiments of the present invention will be apparent in light of this disclosure and the following claims.

What is claimed is:

1. A system for detecting congestion at a receive segment of a port of a fibre channel switch element, comprising:
   a counter at the receive segment that is incremented when an indicator is set indicating that a receive buffer at the receive segment is full; wherein the receive buffer is used for temporarily storing fibre channel frames at the receive segment;
   a threshold register for storing a threshold value for detecting congestion at the receive segment; wherein an output value from the counter is compared with the threshold value and if the output value is greater than the threshold value, then congestion is detected at the receive segment; and
   a receive buffer log that stores a destination identifier value and a source identifier value for frames received at the receive segment; and the rate at which the receive buffer log changes, indicates how quickly frames are moving through the receive segment to a transmit segment of the port.

2. The system of claim 1, wherein a threshold event is triggered if the output from the counter is greater than the threshold value; and the threshold event generates an interrupt for a processor of the fibre channel switch element, notifying the processor of congestion at the receive segment of the port.

3. The system of claim 1, further comprising:
   a register that maintains count for frames that are routed to another switch element and by comparing the register count with an overall received frame count, a percentage of frames that are routed within the fibre channel switch element is determined.

4. A system for determining over-subscription in a transmit segment of a port of a fibre channel switch element, comprising:
   an over-subscription module that receives information regarding a rate at which a plurality of source ports transmit frames and a number of frames that are waiting to be transmitted by the plurality of source ports, at any given time;
   wherein the over-subscription rate is determined by the following:

$$((R0*F0)+(R1*F1)+\ldots(R(n-1)*F(n-1)))/T;$$

where "n" is a number of the plurality of source ports, "R" is a rate at which the plurality of source ports operate, "T" is a number of frames that are waiting to be transmitted at any given time, and "T" is a transmit rate for the transmit segment;
   wherein the transmit segment is over-subscribed if frames arrive faster than a rate at which the transmit segment transmit the frames.

5. The system of claim 4, further comprising:
   a register that stores information regarding a rate at which the plurality of source ports transfer data; and
   a counter that counts entries indicating a number of frames waiting to be transmitted at each of the plurality of source ports, at any given time;
   wherein values from the register and the counter are input into the over-subscription module for determining the over-subscription rate.

6. The system of claim 4, wherein the determined over-subscription value is compared to a stored threshold value and if the determined over-subscription value is greater than the threshold value, then an over-subscription status is set for the port.

7. A method for determining over-subscription in a transmit segment of a port for a fibre channel switch element, comprising:
   determining an over-subscription value based on following:

$$((R0*F0)+(R1*F1)+\ldots(R(n-1)*F(n-1)))/T;$$

where "n" is a number of a plurality of source ports sending frames to the port, "R" is a rate at which the plurality of source ports operate, "F" is a number of frames that are waiting to be transmitted at any given time, and "T" is a transmit rate for the transmit segment;
   wherein the transmit segment is over-subscribed if frames arrive faster than a rate at which the transmit segment transmits the frames; and
   notifying a processor for the fibre channel switch element of the over-subscription, if the determined over-subscription value is different from a stored threshold value.

8. The method of claim 7, wherein the threshold value is programmable.

9. The method of claim 7, wherein a register stores information regarding a rate at which the plurality of source ports transfer data; and a counter counts entries indicating a number of frames waiting to be transmitted at each of the plurality of source ports, at any given time; wherein values from the register and the counter are input into an over-subscription module for determining the over-subscription value.

10. The method of claim 7, wherein if the determined over-subscription value is greater than the threshold value, then an over-subscription status is set for the port.

* * * * *

UNITED STATES PATENT AND TRADEMARK OFFICE
CERTIFICATE OF CORRECTION

PATENT NO. : 7,522,529 B2 Page 1 of 1
APPLICATION NO. : 10/895175
DATED : April 21, 2009
INVENTOR(S) : Frank R. Dropps et al.

It is certified that error appears in the above-identified patent and that said Letters Patent is hereby corrected as shown below:

Title Page, Item (56)
On page 5, in column 2, under "Other Publications", line 63, delete "Oct. 18, 2008" and insert -- Oct. 8, 2008 --, therefor.

In column 11, line 23, delete "Register"(FIG. 5," and insert -- Register" (FIG. 5, --, therefor.

In column 11, line 27, delete "Counter"(FIG. 5," and insert -- Counter" (FIG. 5, --, therefor.

In column 16, line 3, in claim 4, delete ""T"" and insert -- "F" --, therefor.

Signed and Sealed this

Twenty-sixth Day of October, 2010

David J. Kappos
*Director of the United States Patent and Trademark Office*